US012539610B2

(12) United States Patent
Makhal et al.

(10) Patent No.: US 12,539,610 B2
(45) Date of Patent: Feb. 3, 2026

(54) METHODS, SYSTEMS, AND COMPUTER PROGRAM PRODUCTS FOR REACHABILITY CONSTRAINT MANIPULATION FOR HEIGHT THRESHOLDED SCENARIOS IN ROBOTIC DEPALLETIZATION

(71) Applicant: INTELLIGRATED HEADQUARTERS, LLC, Mason, OH (US)

(72) Inventors: Abhijit Makhal, Cranberry Township, PA (US); Mayank Pathak, Pittsburgh, PA (US); Ayush Jhalani, Pittsburgh, PA (US)

(73) Assignee: Intelligrated Headquarters, LLC, Mason, OH (US)

( * ) Notice: Subject to any disclaimer, the term of this patent is extended or adjusted under 35 U.S.C. 154(b) by 725 days.

(21) Appl. No.: 17/870,648

(22) Filed: Jul. 21, 2022

(65) Prior Publication Data

US 2024/0025043 A1    Jan. 25, 2024

(51) Int. Cl.
*B25J 9/16* (2006.01)
*B65G 59/02* (2006.01)
*B65G 61/00* (2006.01)

(52) U.S. Cl.
CPC ............ *B25J 9/1666* (2013.01); *B65G 59/02* (2013.01); *B65G 61/00* (2013.01); *G05B 2219/39001* (2013.01)

(58) Field of Classification Search
CPC ........ B65G 61/00; B65G 67/24; B65G 59/02; B65G 43/08; B25J 9/1697; B25J 9/1664;
(Continued)

(56) References Cited

U.S. PATENT DOCUMENTS 9,333,649 B1 *  5/2016  Bradski ................. G06V 20/10
9,486,921 B1 * 11/2016  Straszheim ............ B25J 9/1697
(Continued)

FOREIGN PATENT DOCUMENTS

JP        2021-030439 A      3/2021

OTHER PUBLICATIONS

Extended European Search Report Mailed on Dec. 20, 2023 for EP Application No. 23185766, 12 page(s).
(Continued)

*Primary Examiner* — Timothy R Waggoner
(74) *Attorney, Agent, or Firm* — Alston & Bird LLP

(57) ABSTRACT

Methods, apparatuses, systems, computing devices, and/or the like are provided. An example method may include detecting a first set of objects, the first set of objects including two or more palletized objects of a plurality of palletized objects in a stack, wherein the two or more palletized objects of the first set of objects are disposed above a threshold height, wherein the stack has a front side and a back side; determining that a first object of the first set is closer than a second object of the first set is to the front side, wherein the first object of the first set is disposed lower than the second object of the first set; and manipulating an end effector to remove the first object from the stack before removing the second object from the stack and to deposit the first object in one or more deposit locations.

20 Claims, 21 Drawing Sheets

(58) Field of Classification Search
CPC ........ B25J 9/1687; B25J 9/1666; B25J 9/161; B25J 9/1661; B25J 9/1679; G05B 2219/40006
See application file for complete search history.

(56) References Cited

U.S. PATENT DOCUMENTS

| | | | |
|---|---|---|---|
| 9,663,309 | B2 | 5/2017 | Priebe et al. |
| 11,845,191 | B1* | 12/2023 | Kuzhinjedathu ..... B23P 19/007 |
| 2016/0016311 | A1 | 1/2016 | Konolige et al. |
| 2018/0072517 | A1 | 3/2018 | Girtman et al. |
| 2018/0354720 | A1* | 12/2018 | Nakano .................. B25J 9/0093 |
| 2020/0148489 | A1* | 5/2020 | Diankov .................... G06T 7/55 |
| 2021/0053216 | A1 | 2/2021 | Diankov et al. |
| 2021/0205995 | A1 | 7/2021 | Vu et al. |
| 2023/0133113 | A1* | 5/2023 | Makhal ..................... G06T 7/62 382/141 |

OTHER PUBLICATIONS

Hideichi Nakamoto et al., "High-speed and Compact Depalletizing Robot Capable of Handling Packages Stacked Complicatedly," 2016 IEEE/RSJ International Conference on Intelligent Robots and Systems (IROS), 344-349, (Oct. 9, 2016).
Riccardo Caccavale et al., "A Flexible Robotic Depalletizing System for Supermarket Logistics," IEEE Robotics and Automation Letters, 5(3):4471-4476, (Jul. 2020).
Communication about intention to grant a European patent Mailed on Aug. 6, 2025 for EP Application No. 23185766, 6 page(s).
Decision to grant a European patent Mailed on Dec. 4, 2025 for EP Application No. 23185766, 2 page(s).

* cited by examiner

Algorithm 1 Group Offset Algorithm
Input: $G_{jp}, V_{1,...,m}, L_{j,...,m}, Res_V$
Output: $G_{jp}$

```
1: function GENERATECOLLISIONFREEGRASP
2:     for i ← 1 to N do
3:         for j ← 1 to M do
4:             if Collision then
5:                 G_{jp} ← Optimize(G_{jp} + Res_V)
6:             else
7:                 G_{jp} ← G_{jp}
8:             end if
9:         end for
10:        return Sum
11:    end for
12: end function
```

FIG. 6C

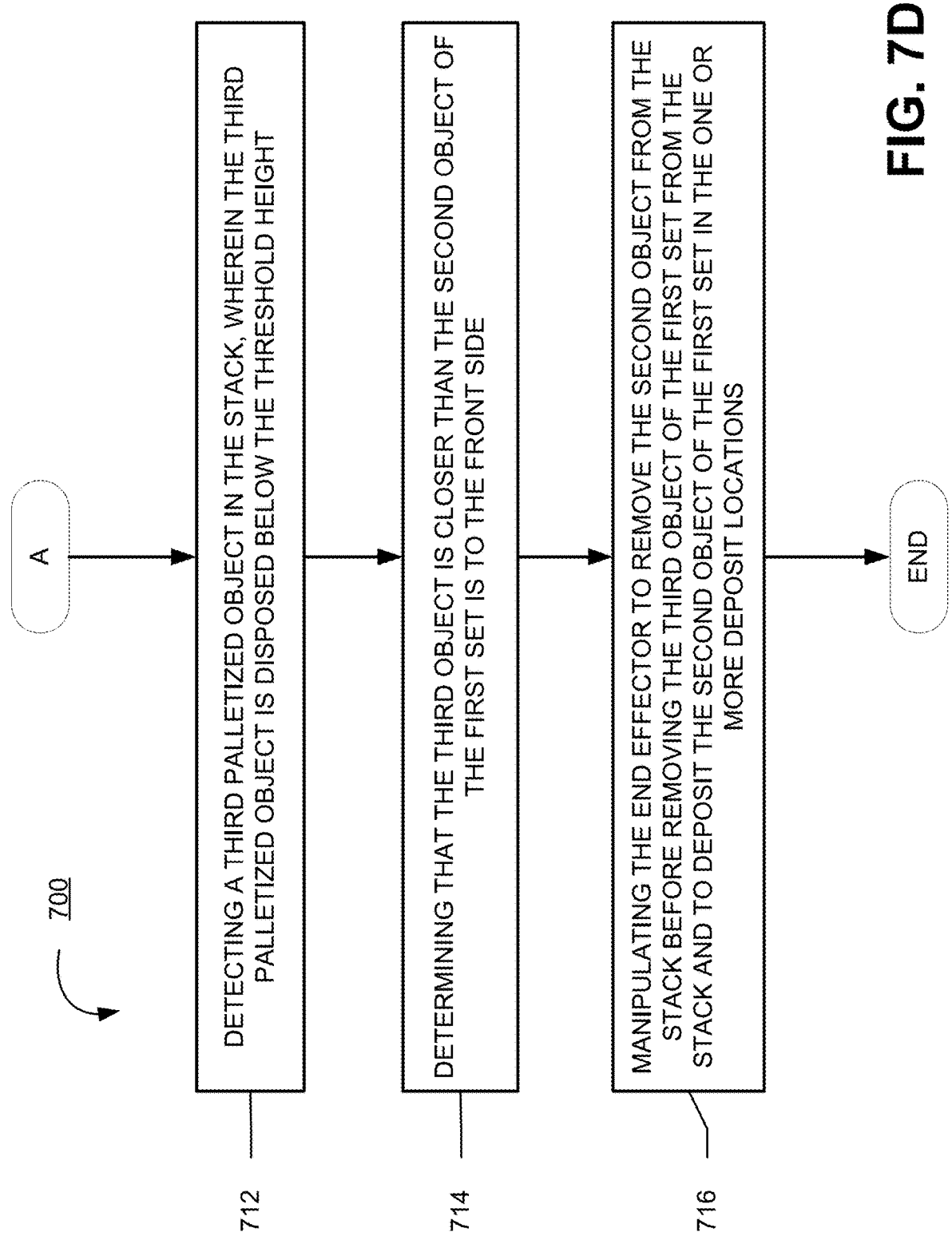

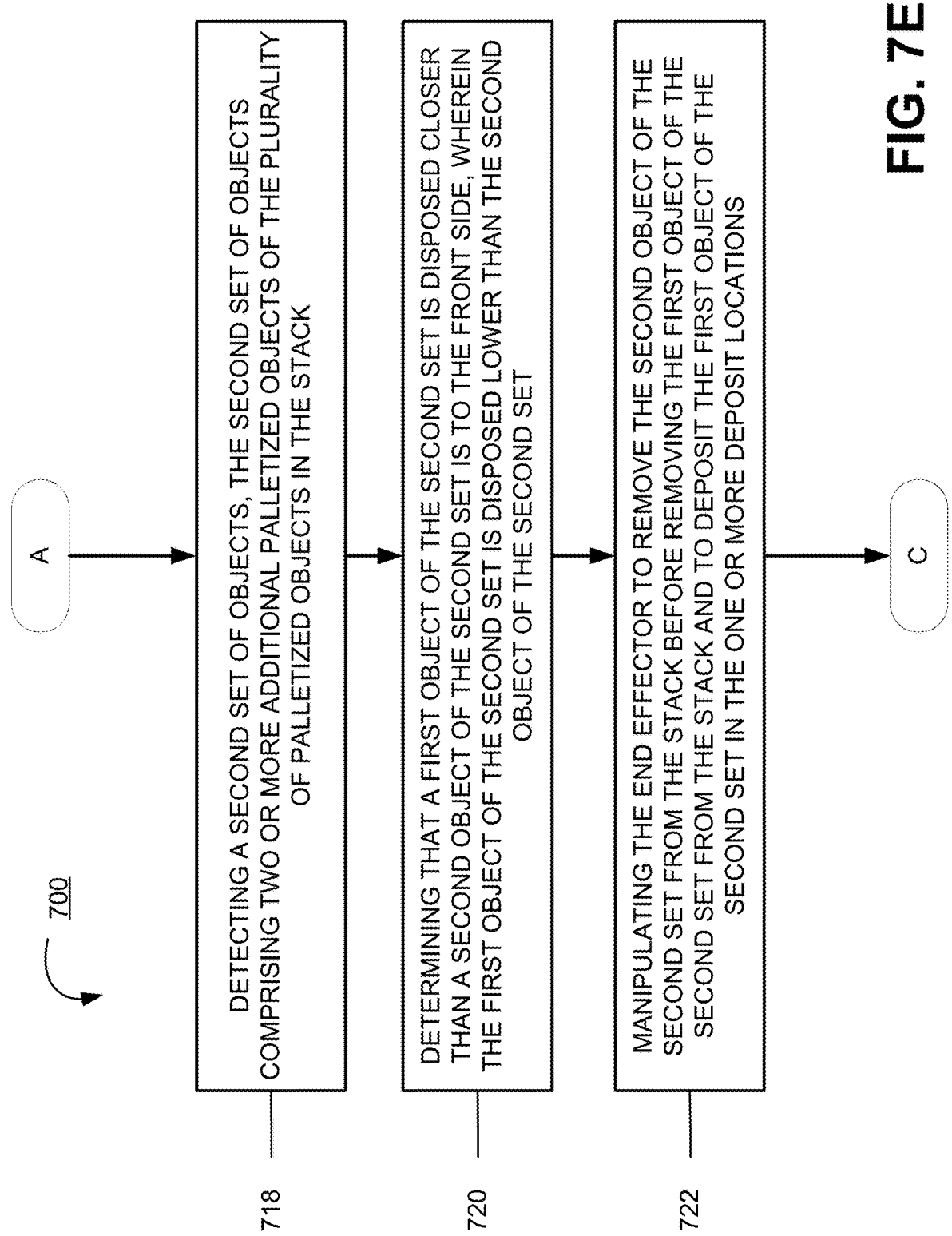

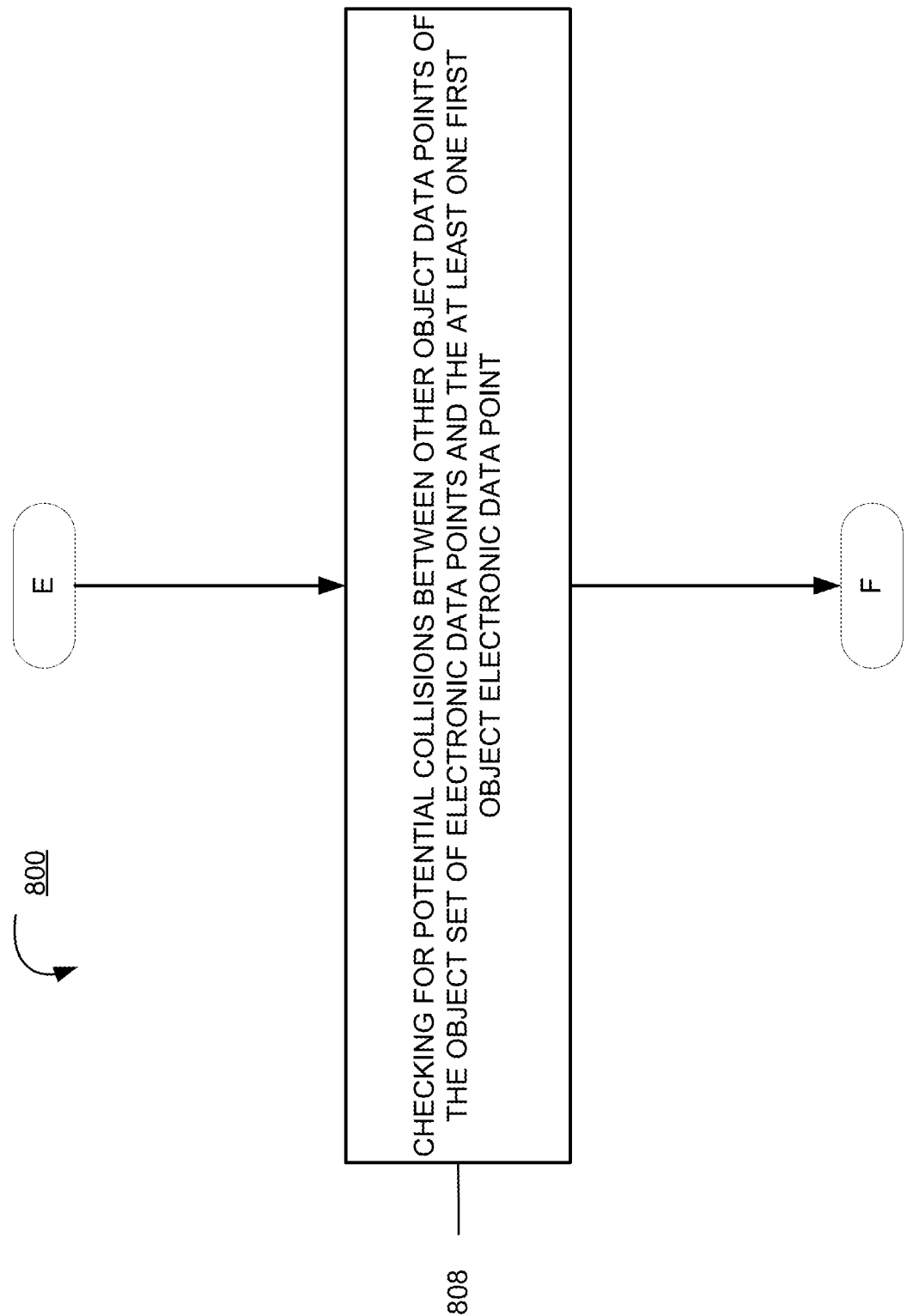

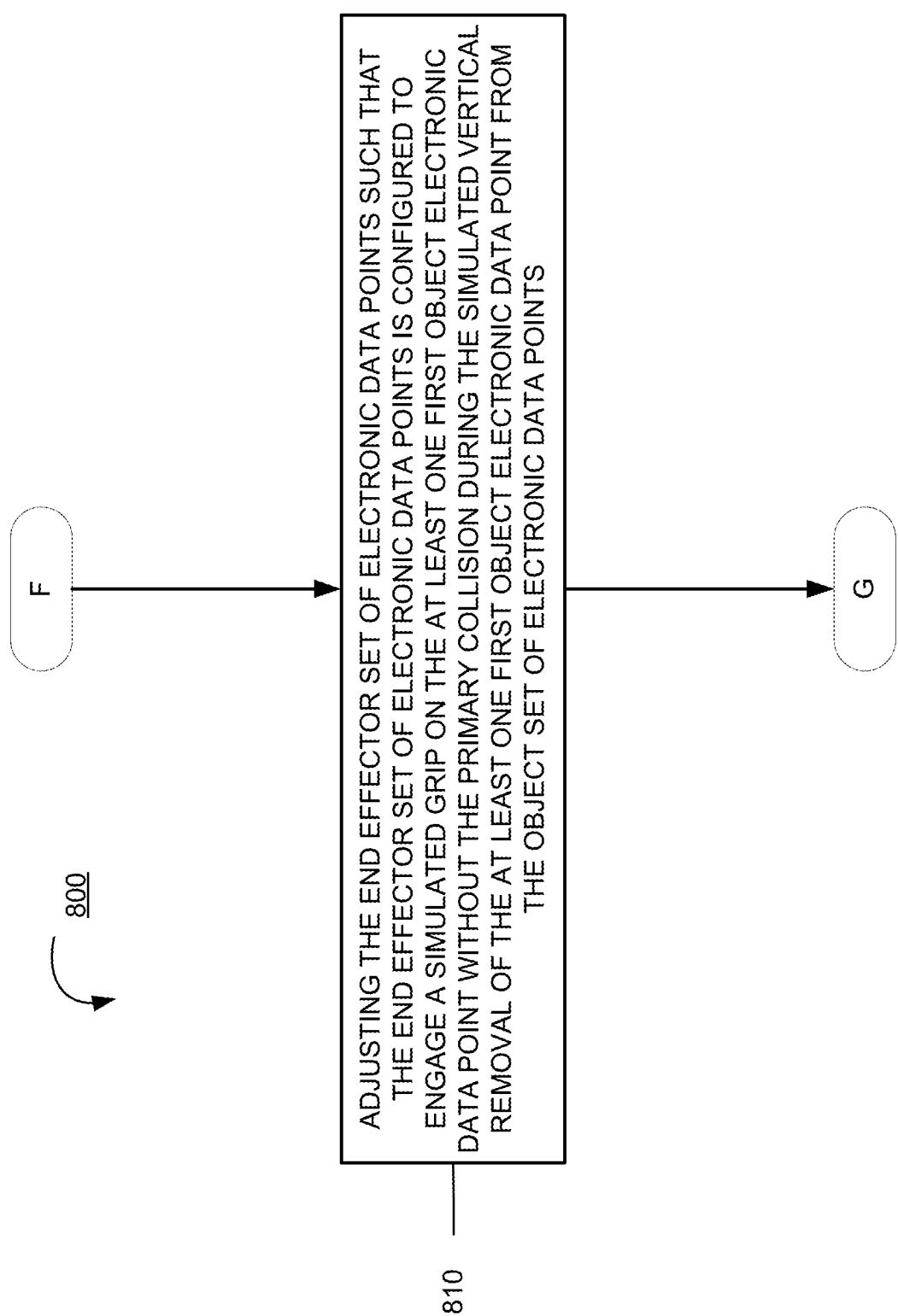

METHODS, SYSTEMS, AND COMPUTER PROGRAM PRODUCTS FOR REACHABILITY CONSTRAINT MANIPULATION FOR HEIGHT THRESHOLDED SCENARIOS IN ROBOTIC DEPALLETIZATION

TECHNICAL FIELD

The present disclosure relates generally to automated industrial systems, and more particularly to robotics related to depalletization.

BACKGROUND

Palletizing refers to an operation of loading or conveying an object (such as, but not limited to, a carton, a package, a box, an article, and/or the like) into or onto a stack, such as loading or conveying the object onto a pallet, surface, region, location, or a similar device or space. Depalletizing refers to the operation of unloading or moving an object (such as, but not limited to, a carton, a package, a box, an article, and/or the like) from a stack, such as away from a pallet, surface, region, location, or a similar device or space. Palletization and depalletization may be aided in some instances by means of a robotic system configured for palletization and/or depalletization.

Many palletization and/or depalletization solutions face technical challenges and difficulties. For example, if one or more objects in a stack are blocking or otherwise interfering with the interaction between a robotic system and one or more other objects in the stack, the stack may be tipped over and/or the objects may be damaged by the robotic system. The inventors have identified that these interference conditions may change based on the relative positions of the robotic system and the objects.

In a robotic depalletization operation, a robotic system may have a limited range in height which makes depalletization tasks challenging where objects are palletized at very high heights. Through applied effort, ingenuity, and innovation, Applicant has solved problems relating to robotic palletization and depalletization by developing solutions embodied in the present disclosure, which are described in detail below.

BRIEF SUMMARY

In general, aspects of the present disclosure provide methods, apparatuses, systems, computing devices, computing entities, and/or the like.

In accordance with various aspects of the present disclosure a computer-implemented method for robotic depalletization is provided. The computer-implemented method may include detecting a first set of objects. The first set of objects may include two or more palletized objects of a plurality of palletized objects in a stack. The two or more palletized objects of the first set of objects may be disposed above a threshold height. The stack may have a front side and a back side. The computer-implemented method may also include determining that a first object of the first set is closer than a second object of the first set is to the front side. The first object of the first set may be disposed lower than the second object of the first set. The computer-implemented method may further include manipulating an end effector to remove the first object of the first set from the stack before removing the second object of the first set from the stack and to deposit the first object of the first set in one or more deposit locations.

In some aspects, the two or more palletized objects of the first set may also include a third object. The third object of the first set may be lower than the second object of the first set. The third object of the first set may be disposed closer than the second object of the first set is to the front side of the stack. The computer-implemented method may further include manipulating the end effector to remove the third object of the first set from the stack before removing the second object of the first set from the stack and to deposit the third object of the first set in the one or more deposit locations.

In some aspects, the two or more palletized objects of the first set may also include a fourth object. The fourth object of the first set may be disposed farther than the second object of the first set is from the front side of the stack. The computer-implemented method may further include manipulating the end effector to remove the second object of the first set from the stack before removing the fourth object from the stack and to deposit the second object in the one or more deposit locations.

In some aspects, the computer-implemented method may further include detecting a third palletized object in the stack. The third palletized object may be disposed below the threshold height. The computer-implemented method may further include determining that the third object is closer than the second object of the first set is to the front side. The third object may be disposed lower than the second object of the first set. The computer-implemented method may further include manipulating the end effector to remove the second object from the stack before removing the third object of the first set from the stack and to deposit the second object of the first set in the one or more deposit locations.

In some aspects, the computer-implemented method may further include detecting a second set of objects. The second set of objects may also include two or more additional palletized objects of the plurality of palletized objects in the stack. The two or more additional palletized objects of the second set of objects may be disposed below the threshold height. The computer-implemented method may further include determining that a first object of the second set is disposed closer than a second object of the second set is to the front side. The first object of the second set may be disposed lower than the second object of the second set. The end effector may remove the second object of the second set from the stack before removing the first object of the second set from the stack and deposit the first object of the second set in the one or more deposit locations.

In some aspects, the two or more additional palletized objects of the second set may include a third object. The third object of the second set may be lower than the second object of the first set and disposed closer than the second object of the first set is to the front side of the stack. The computer-implemented method may further include manipulating the end effector to remove the second object of the first set from the stack before removing the third object of the second set from the stack and deposit the second object of the first set in the one or more deposit locations.

In some aspects, the computer-implemented method may include detecting a second set of objects. The second set of objects may include two or more additional palletized objects of the plurality of palletized objects in the stack. The two or more additional palletized objects of the second set of objects are disposed below the threshold height. The computer-implemented method may also include manipulating the end effector to remove the first set of objects before removing any of the second set of objects.

In some aspects, the one or more deposit locations may include a conveyor.

In some aspects, the threshold height may be defined by a set of reachability constraints of a robotic system including the end effector.

In some aspects, the first object of the first set may be vertically depalletized by the end effector connected to a robotic arm including the end effector.

In some aspects, the computer-implemented method may include a motion planning step prior to removing the first object of the first set from the stack. The motion planning step may include representing the plurality of palletized objects as an object set of electronic data points, including at least one of a first object electronic data point associated with the first object of the first set, and the end effector as an end effector set of electronic data points. The motion-planning step may also include simulating the vertical removal of the at least one first object electronic data point from the object set of electronic data points by means of the end effector set of electronic data points. The motion-planning step may further include, during the simulated vertical removal of the at least one first object electronic data point, checking for potential collisions between the at least one first object electronic data point and the end effector set of electronic data points.

In some aspects, the motion planning step includes checking for potential collisions between other object data points of the object set of electronic data points and the at least one first object electronic data point.

In some aspects, the motion planning step may include adjusting the end effector set of electronic data points such that the end effector set of electronic data points is configured to engage a simulated grip on the at least one first object electronic data point without the primary collision during the simulated vertical removal of the at least one first object electronic data point from the object set of electronic data points.

In some aspects, the motion planning step may include checking for a pose of a colliding data point associated with the primary collision between the end effector set of electronic data points and the first object set of electronic data points and shifting the simulated grip to avoid the primary collision.

In some aspects, the object set of electronic data points are voxels.

According to some aspects, a robotic depalletization system is provided. The system may include a perception subsystem configured to detect a first set of objects. The first set of objects may include two or more palletized objects of a plurality of palletized objects in a stack. The two or more palletized objects may be disposed above a threshold height. The stack may have a front side and a back side. The system may also include a processing device configured to determine, based at least in part on the detected first set of objects, that a first object of the first set is disposed closer than the second object of the first set is to the front side of the stack. The first object of the first set may be disposed lower than the second object of the first set. The system may further include a robotic arm. The robotic arm may include an end effector. The end effector may be configured to manipulate the first object of the first set and remove from the stack the first object of the first set before removing from the stack the second object of the first set, the robotic arm further configured to deposit the first object of the first set in one or more deposit locations.

In some aspects, the robotic arm may have a reachability constraint, and the perception subsystem may be further configured to set the threshold height based on the reachability constraint.

In some aspects, the robotic depalletization system may include a motion planning system. The robotic depalletization system may represent a plurality of palletized objects as an object set of electronic data points, including a first object set of electronic data points associated with the first object of the first set, and the end effector as an end effector set of electronic data points. The robotic depalletization system may also simulate the vertical removal of the first object set of electronic data points from the object set of electronic data points by means of the end effector set of electronic data points. The robotic depalletization system may further include, during the simulated vertical removal of the first object set of electronic data points, detect any potential collisions between the first object set of electronic data points and the robotic set of electronic data points.

According to some aspects, there is provided a computer program product including at least one non-transitory computer-readable storage medium having computer-readable program code portions stored therein. The computer-readable program code portions may include an executable portion. The executable portion may be configured to detect, from a perception subsystem associated with a depalletization system, a first set of objects. The first set of objects may include two or more palletized objects of a plurality of palletized objects in a stack. The two or more palletized objects of the first set may be disposed above a threshold height. The stack may have a front side and a back side. The executable portion may also be configured to determine, based at least in part on the detected first set of objects, that a first object of the first set is disposed closer than a second object of the first set is to the front side of the stack. The first object of the first set may be disposed lower than the second object of the first set. The executable portion may further be configured to manipulate an end effector associated with a depalletization system to remove the first object of the first set from the stack before removing the second object of the first set from the stack and depositing the first object of the first set in one or more deposit locations.

In some aspects, the executable portion of the computer-readable program code portion is further configured to represent a plurality of palletized objects as an object set of electronic data points, including a first object set of electronic data points associated with the first object of the first set, and the end effector as an end effector set of electronic data points. The executable portion may also be configured to simulate the vertical removal of the first object set of electronic data points from the object set of electronic data points by means of the end effector set of electronic data points. The executable portion may further be configured to, during the simulated vertical removal of the first object set of electronic data points, detect any potential collisions between the first object set of electronic data points and the robotic set of electronic data points.

The above summary is provided merely for purposes of summarizing some example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 8A:
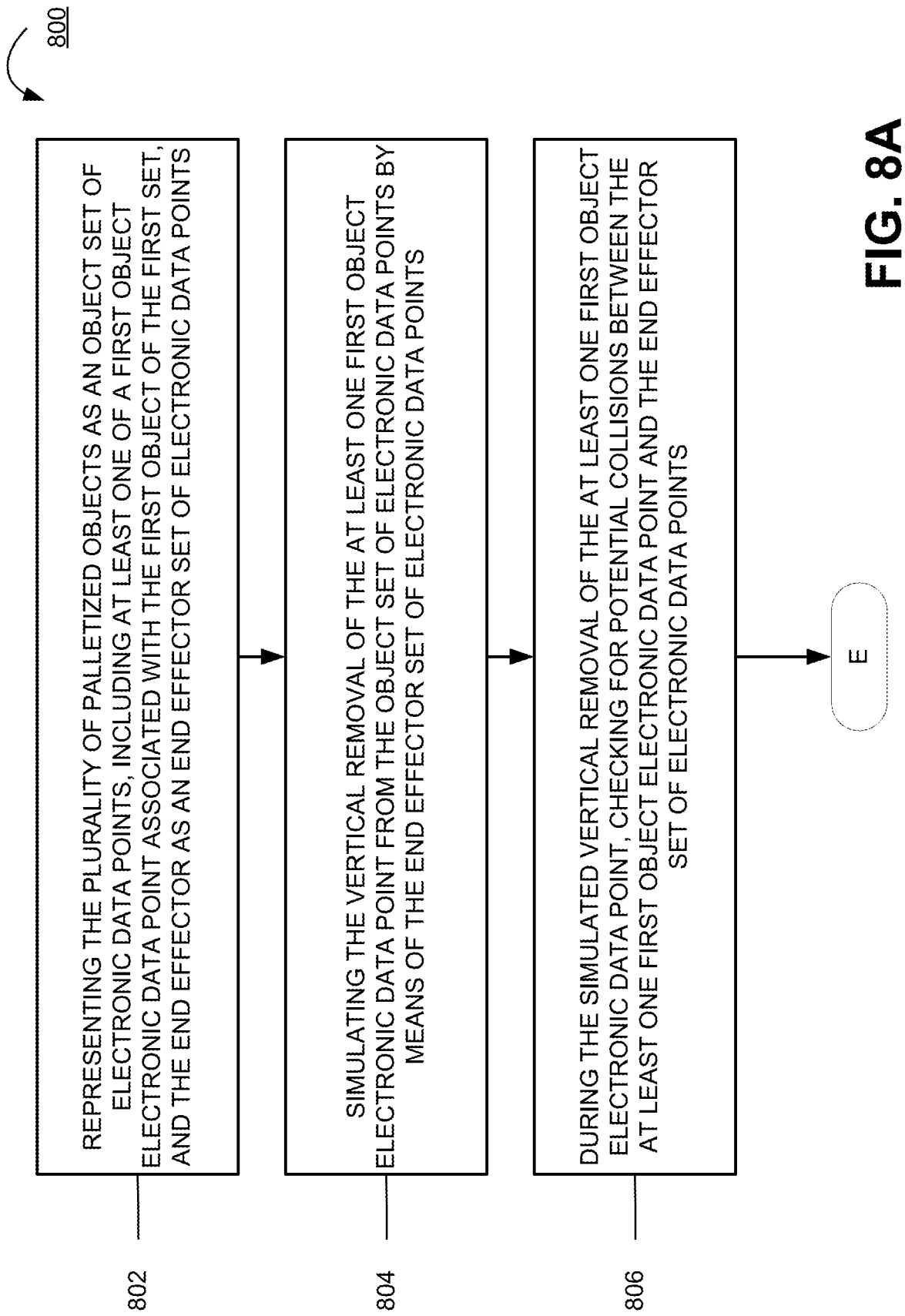
Figure 8D:
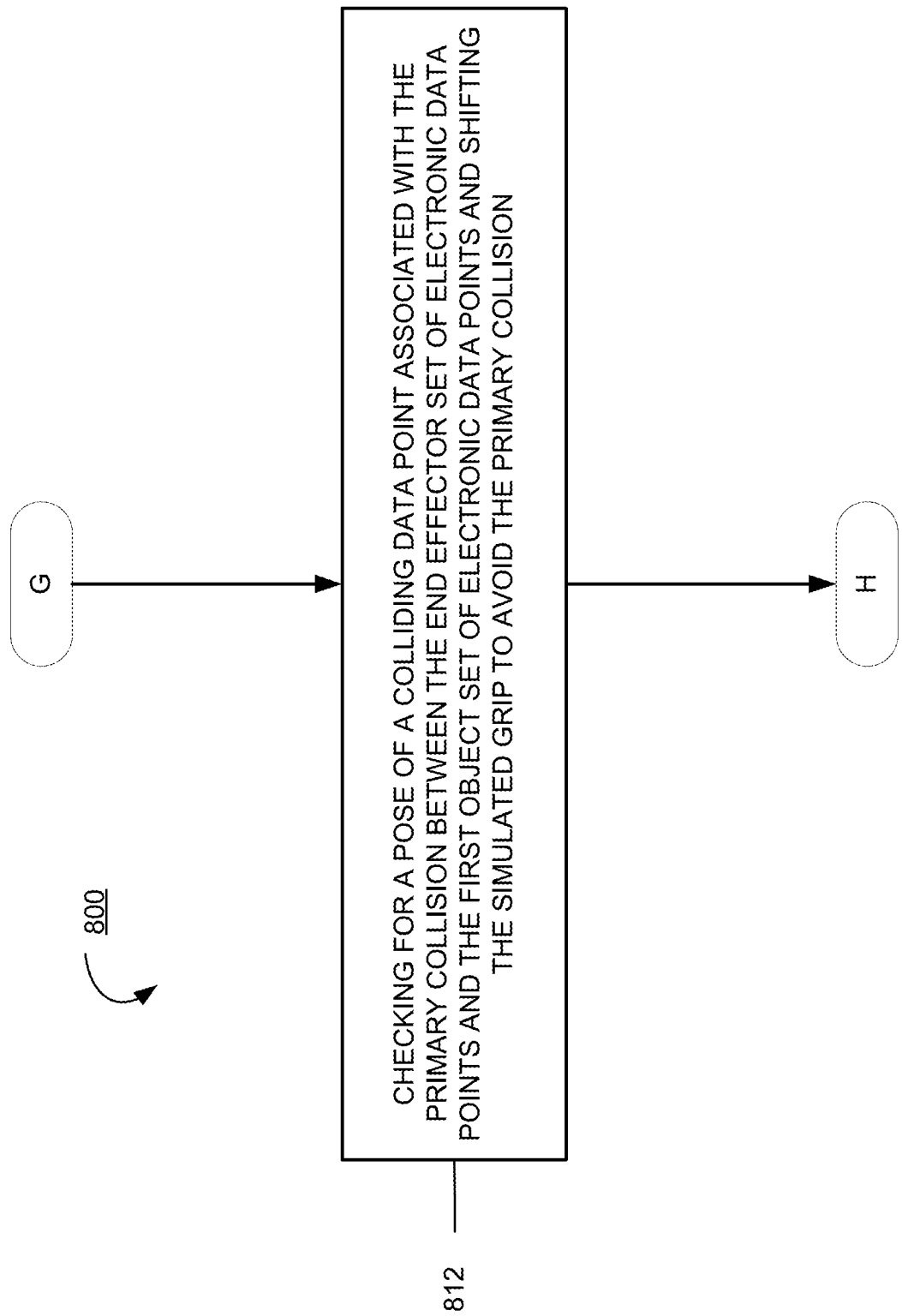
Figure 9:

FIG. 4, FIG. 5, FIG. 6A, and FIG. 6B are example diagrams illustrating example depalletization of objects on example pallets in accordance with various aspects of the present disclosure;

FIG. 6C is an example of a grasp offsetting algorithm for example computer-implemented methods of depalletization in accordance with various aspects of the present disclosure;

FIGS. 7A-7G are example flow diagrams illustrating example computer-implemented methods of depalletization in accordance with various aspects of the present disclosure;

FIGS. 8A-8D are example flow diagrams illustrating example motion planning steps for example computer implemented methods of depalletization in accordance with various aspects of the present disclosure; and FIG. 9 is an example three-dimensional representation of electronic data points showing an example depalletization system and an example surrounding environment in accordance with various aspects of the present disclosure.

DETAILED DESCRIPTION OF SOME EXAMPLE ASPECTS

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one aspect," "according to one aspect," and/or the like generally mean that the particular feature, structure, or characteristic following the phrase may be included in at least one aspect of the present disclosure and may be included in more than one aspect of the present disclosure (importantly, such phrases do not necessarily may refer to the same aspect).

Aspects of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, aspects of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one aspect, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one aspect, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where aspects are described to use a computer-readable storage medium, other types of computer-readable storage media may be substituted for or used in addition to the computer-readable storage media described above.

As should be appreciated, various aspects of the present disclosure may also be implemented as methods, apparatuses, systems, computing devices, computing entities, and/or the like. As such, aspects of the present disclosure may take the form of a data structure, apparatus, system, computing device, computing entity, and/or the like executing instructions stored on a computer-readable storage medium to perform certain steps or operations. Thus, aspects of the present disclosure may also take the form of an entirely hardware aspect, an entirely computer program product aspect, and/or an aspect that comprises combination of computer program products and hardware performing certain steps or operations.

Aspects of the present disclosure are described below with reference to block diagrams and flowchart illustrations. Thus, it should be understood that each block of the block diagrams and flowchart illustrations may be implemented in the form of a computer program product, an entirely hardware aspect, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary aspects, retrieval, loading, and/or execution may be performed in parallel such that multiple instructions are retrieved, loaded, and/or executed together. Thus, such aspects can produce specifically-configured machines performing the steps or operations specified in the block diagrams and flowchart illustrations. Accordingly, the block diagrams and flowchart illustrations support various combinations of aspects for performing the specified instructions, operations, or steps.

Overview

In environments such as distribution centers, warehouses, and/or the like, objects may be conveyed on a pallet, and one or more robotic depalletization devices may be utilized to depalletize objects (e.g., boxes, articles, packages, products) from a stack on the pallet. In some embodiments, the robotic depalletization may be performed autonomously by the various hardware and software components detailed herein. In some depalletization operations, the robotic system may pick objects one entire layer at a time. See, e.g., FIG. 4, discussed in greater detail at a separate portion in this disclosure. After clearing a layer of objects, the robotic system may then continue on to the next. In some instances, such motion planning fails while performing depalletization where the objects are to be lifted from high locations (e.g., closer to the top of the stack). As a result, the chances of collision with other portions of the stack increase in these higher locations on the stack.

Various embodiments of the present disclosure relate to apparatuses, systems, computer program products, methods, and the like for depalletization. Various embodiments may include a robotic system for depalletizing objects from a stack, and the robotic system may have one or more sets of reachability constraints that define boundaries and limits of the robotic system's capabilities, such as a threshold height. Some embodiments may include depalletizing a first group of vertically oriented objects that are closer to a conveyor and/or a front of the stack down to the threshold height prior to depalletizing a second group of vertically oriented objects farther back from the conveyor and/or the front of the stack than the first group of objects down to the threshold height after depalletizing the first set of objects. In some embodiments, the robotic system may depalletize the objects in a vertical direction based on collision checking between an end effector and electronic data points (e.g., voxels arranged in a three-dimensional grid) representing an object to be picked.

In some aspects, the objects in the stack are of a single, same stock keeping unit (SKU), which indicates that all the objects in the stack are of the same type (e.g., having the same sizes and shapes). In such examples, an example depalletization system may only need to detect the position of the object to depalletize the object, as the sizes and shapes can be determined/known by the example depalletization system based on the same SKU.

In some aspects, at least some of the objects in the stack are of mixed, different SKUs, which indicates that the objects in the stack are of different types (e.g., having different sizes and/or shapes). In such example, an example depalletization system may rely on vision system (such as a perception subsystem) to determine the size and/or the shape of the objects so that the depalletization device can depalletize the objects from the pallet (for example, calculate the pose of the depalletization device based at least in part on the size and/or the shape of the objects). In some aspects, various heuristics can be used for depalletizing objects when they are of different types, such as, for example, object height, object pick area (i.e., the length of the object multiplied by its width), and other appropriate heuristics as understood by those skilled in the art. The various algorithms and processes described herein can utilize these heuristics to determine the pick order and robotic system movements.

Example Depalletization Systems

Figure 1A:
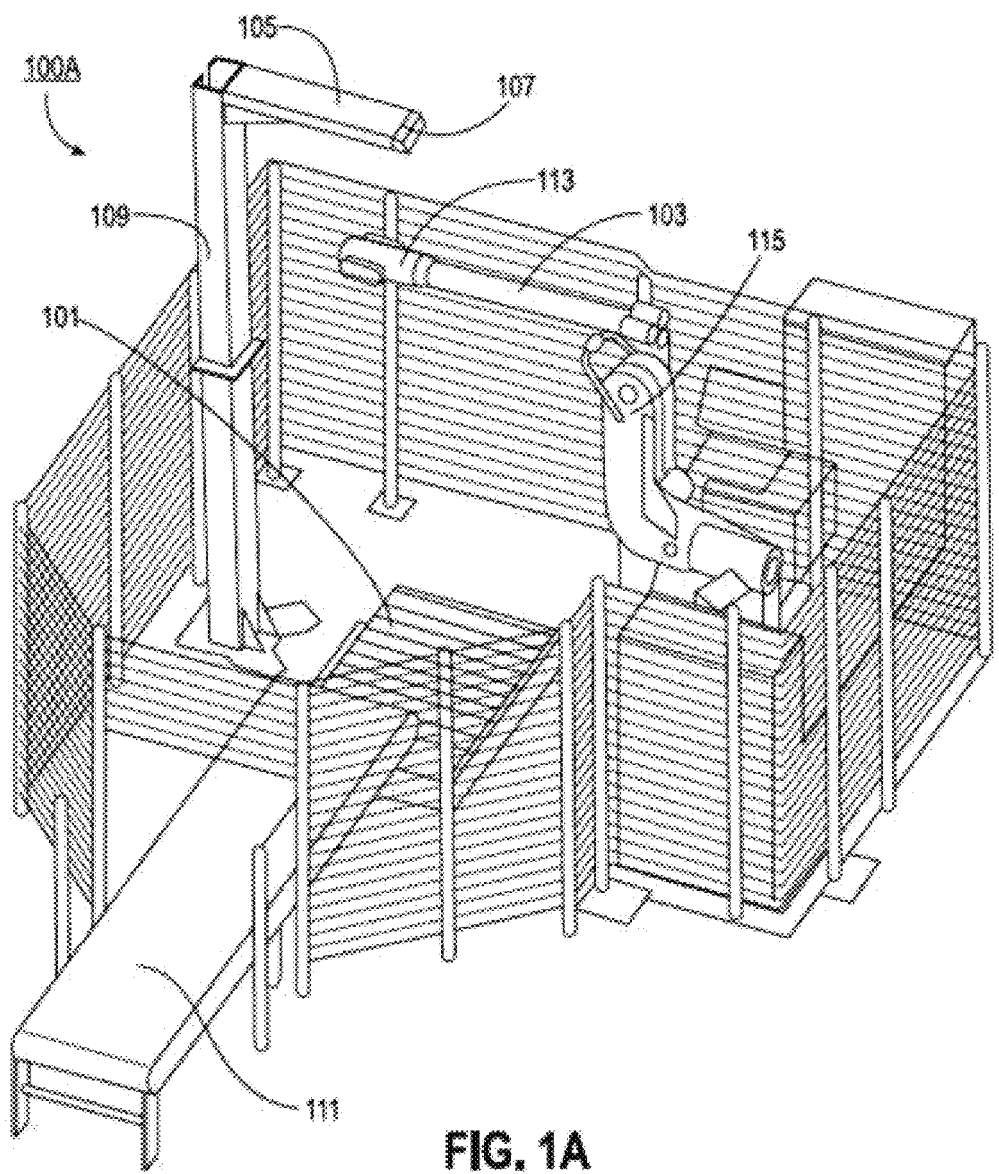
FIG. 1A is an example perspective view of an example depalletization system that can be used in accordance with various aspects of the present disclosure.

FIG. 1A is an example perspective view of an example depalletization system that can be used in accordance with various aspects of the present disclosure. It will be understood that the system 100A can also be used as a palletization system. In such an embodiment, the picking order is reversed from the depalletization embodiments discussed herein, with the system planning and stacking objects into a pallet having a minimum volume according to the reverse of the sequencing described herein with respect to depalletization.

In the example shown in FIG. 1A, the example depalletization system 100A comprises a depalletization device 103. In some aspects, the depalletization device 103 is part of an execution subsystem of the depalletization system 100A.

In the example shown in FIG. 1A, the depalletization device 103 may be in the form of a robotic depalletization. For example, the depalletization device 103 may comprise an end effector 113 and a robotic arm 115 connected to the end effector 113. In some aspects, the depalletization device 103 may comprise one or more controller, sensors, and/or drives to cause and control operations of the end effector 113 and/or the robotic arm 115.

In some aspects, the depalletization device 103 is positioned adjacent to a pallet 101. In some aspects, to depalletize an object from the pallet 101, one or more grasp poses and grasp points are calculated for the depalletization device 103. For example, the robotic arm 115 may be moved and/or rotated so that the end effector 113 can be positioned on an object from the pallet 101. In some aspects, the end effector 113 may retrieve and/or grasp the object (for example, through suction mechanism, and/or the like), and the robotic arm 115 may be moved so as to lift the object to a lift height (and the height of the end effector 113 is referred to as a grasp pose height). Subsequent to lifting the object, the robotic arm 115 may be moved and/or rotated so that the object that is grasped by the end effector 113 is positioned above the conveyor 111. Subsequently, the end effector 113 releases the object onto one or more deposit locations, which in some aspects is the conveyor 111, thereby completing the operation of depalletizing the object from the pallet 101 onto the conveyor 111. It will be understood that one or more deposit locations could include any number of locations considered suitable for depositing objects, including, but not limited to, a warehouse floor, a truck or trailer bed, a cargo or shipping container, or rail freight transport. It will further be understood that, according to some aspects, the one or more deposit locations (e.g., the conveyor 111) may include another pallet or loading area, such as (but not limited to) when system 100A is being used as a palletizing system.

As described above, a depalletization system may rely on a perception subsystem 202 to capture data related to the objects such that the grasp poses and grasp points of the depalletization device can be determined. For example, in some aspects and as referred to in greater detail at other places in this disclosure, the perception subsystem may be used to determine a threshold height 502. See, e.g., FIG. 5. Referring now to the examples shown in FIG. 1A, the example depalletization system 100A comprises a vision structure 105. In some aspects, the vision structure 105 is part of a perception subsystem of the depalletization system 100A.

In some aspects, the vision structure 105 is positioned adjacent to the pallet 101. For example, the vision structure 105 comprises a vertical beam 109 that is connected to a horizontal beam 107. In some aspects, one or more image capture devices may be disposed on the horizontal beam 107 and/or the vertical beam 109.

For example, a 2-D image capture device may be disposed near an end of the horizontal beam 107 and facing the pallet 101 so as to capture a 2-D image that is a top view of the pallet 101 (e.g., showing objects on the top pallet layer). Examples of 2-D image capture devices may include, but are not limited to, cameras, 2-D image sensors, and/or the like. In some aspects, the 2-D image may be used to determine a width and/or a length of the object.

Additionally, or alternatively, a 3-D image capture device may be disposed on the horizontal beam 107 and facing the pallet 101 so as to capture a 3-D image of the pallet 101. In some aspects, the 3-D image capture device may be disposed moveably along the vertical beam 109 and/or the horizontal beam 107. Examples of 3-D image capture devices may include, but are not limited to, time-of-flight image sensors, stereoscopic imaging sensors, and/or the like. In some aspects, the 2-D image may be used to determine a width and/or a height of the object.

In some aspects, a height sensing device may be disposed at the end of the conveyor 111 adjacent to the pallet 101. In some aspects, the height sensing device may be part of the depalletization system 100A and is configured to sense height data, details of which are described herein. Examples of height sensing devices include, but are not limited to, LiDAR sensors and/or the like. The system may also use a horizontal position sensing device or a single device may perform the functions of both the horizontal and height sensing devise using the hardware and/or software described herein.

Figure 1B:
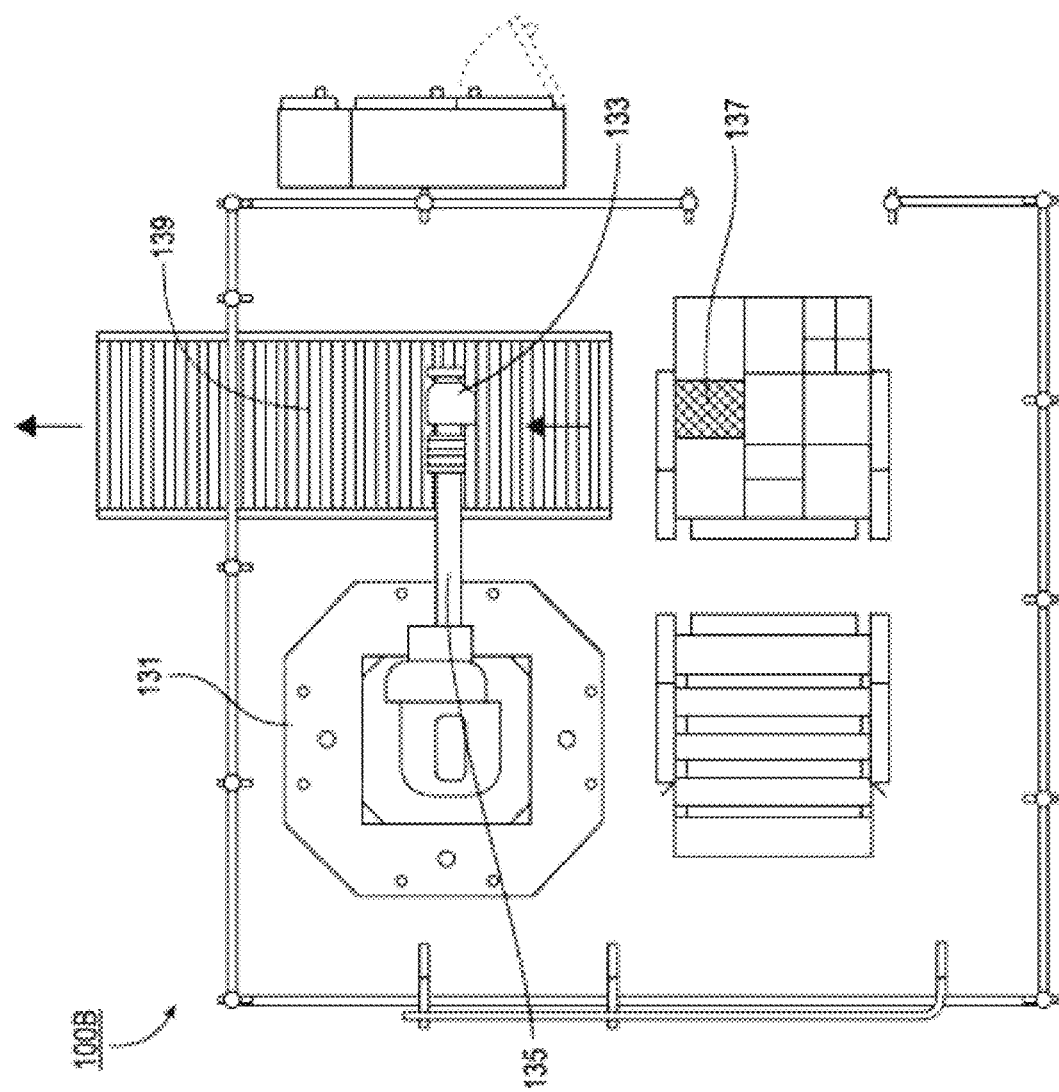
FIG. 1B is an example diagram illustrating an example depalletization system that can be used in accordance with various aspects of the present disclosure.

FIG. 1B is an example diagram illustrating an example depalletization system 100B that can be used in accordance with various aspects of the present disclosure.

In the example shown in FIG. 1B, the example depalletization system 100B comprises a depalletization device 131 that includes an end effector 133 connected to a robotic arm 135. In some aspects, the end effector 133 may depalletize objects from the pallet 137 onto the conveyor 139, similar to those described above in connection with FIG. 1A.

FIG. 1B is an example diagram illustrating an example depalletization system that can be used in accordance with various aspects of the present disclosure.

In the example shown in FIG. 1B, the example depalletization system 100B comprises a depalletization device 131 that includes an end effector 133 connected to a robotic arm 135. In some aspects, the end effector 133 may depalletize objects from the pallet 137 onto the conveyor 139, similar to those described above in connection with FIG. 1A.

Figure 2:
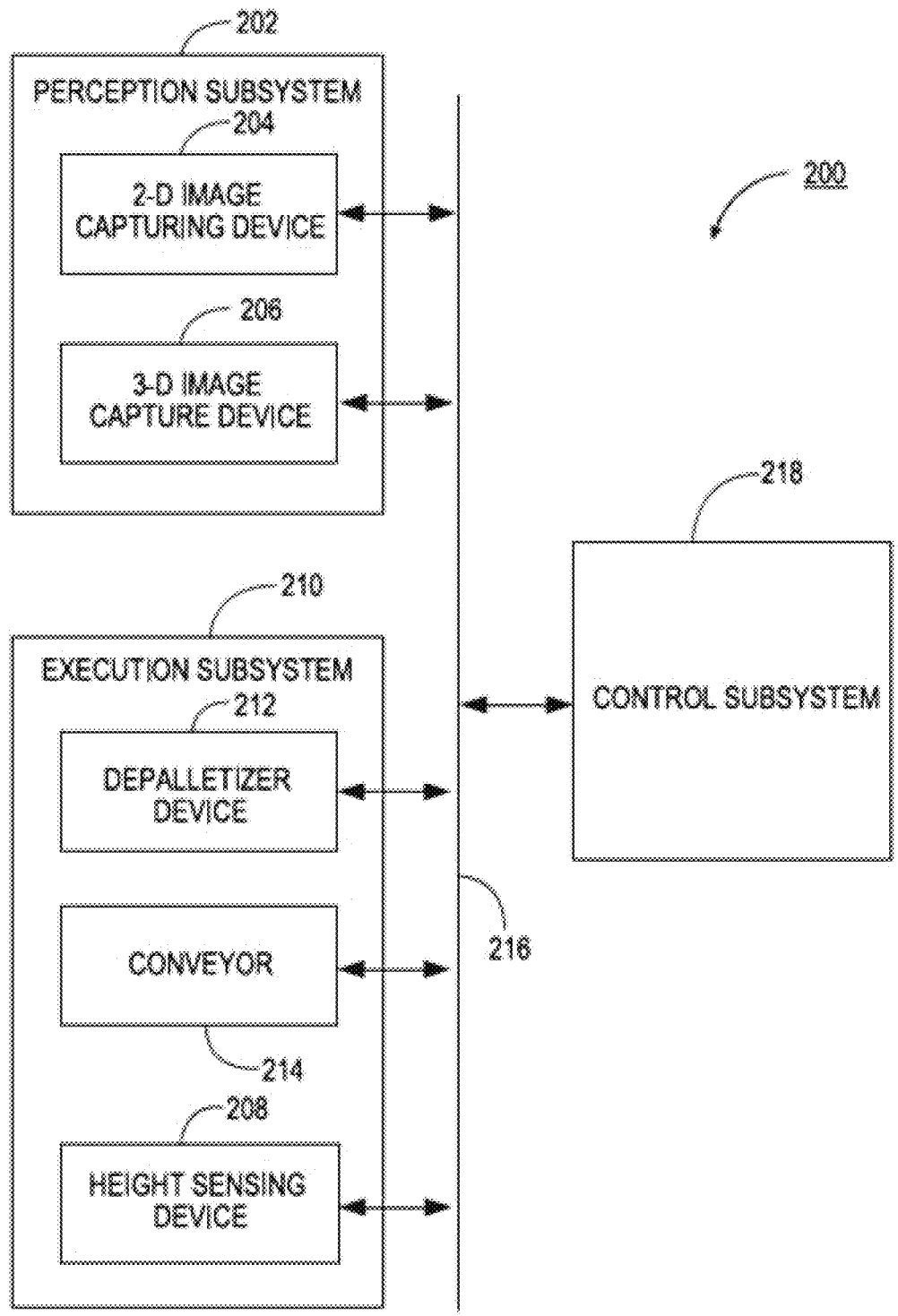
FIG. 2 is an example schematic representation of example components in an example depalletization system in accordance with various aspects of the present disclosure.

FIG. 2 is an example schematic representation of example components in an example depalletization system in accordance with various aspects of the present disclosure.

In particular, FIG. 2 illustrates example data communications between various components of the example depalletization system 200.

In the example shown in FIG. 2, the example depalletization system 200 comprises a perception subsystem 202, an execution subsystem 210, and a control subsystem 218 that can exchange data and/or information via the system bus 216.

In some aspects, the perception subsystem may generate imaging data and transmit the imaging data to the control subsystem 218 via the system bus 216. In particular, the perception subsystem 202 may comprise a 2-D image capturing device 204 (similar to the 2-D image capturing device described above in connection with at least FIG. 1A). In some aspects, the 2-D image capturing device 204 may generate 2-D image data and transmit the 2-D image data to the control subsystem 218 via the system bus 216. Additionally, or alternatively, the perception subsystem 202 may comprise a 3-D image capturing device 206 (similar to the 3-D image capturing device described above in connection with at least FIG. 1A). In some aspects, the 3-D image capturing device 206 may generate 3-D image data and transmit the 3-D image data to the control subsystem 218 via the system bus 216.

In some aspects, the control subsystem 218 may transmit control instructions to the execution subsystem 210 via the system bus 216 so as to control the operations associated with the devices of execution subsystem 210.

In some aspects, the execution subsystem 210 may comprise a height sensing device 208. In some aspects, the height sensing device 208 may generate height data and transmit the height data to the control subsystem 218.

For example, the execution subsystem 210 may comprise a depalletization device 212. In such an example, the control subsystem 218 may transmit control instructions to the depalletization device 212 so as to control the operations of the depalletization device 212 and/or cause the depalletization device 212 to operate in a certain way, details of which are described herein.

Additionally, or alternatively, the execution subsystem 210 may comprise a conveyor 214. In such an example, the control subsystem 218 may transmit control instructions to the conveyor 214 so as to control the operations of the conveyor 214 and/or cause the conveyor 214 to operate in a certain way.

In some aspects, the system bus 216 may be in various forms. For example, the system bus 216 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system bus 216 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control subsystem 218 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Figure 3:
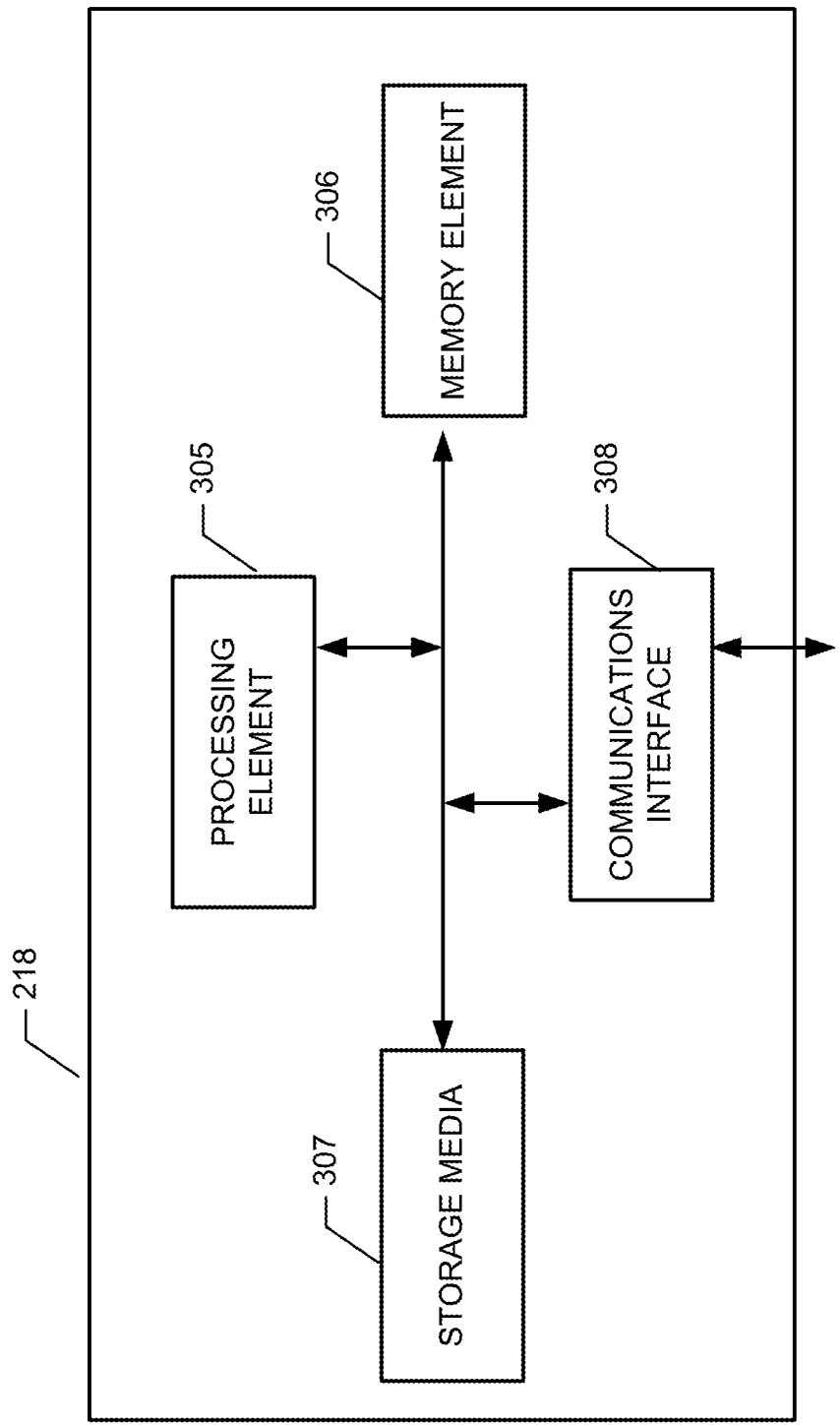
FIG. 3 is a schematic representation of example components in an example control subsystem in accordance with various aspects of the present disclosure.

FIG. 3 is a schematic representation of example components in an example control subsystem in accordance with various aspects of the present disclosure.

As shown in FIG. 3, in one aspect, the control subsystem 218 may include or be in communication with one or more processing elements (for example, processing element 305) (also referred to as processors, processing circuitry, and/or similar terms used herein interchangeably) that communicate with other elements within the control subsystem 218 via a bus, for example, or network connection. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware aspect or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to aspects of the present disclosure when configured accordingly.

In one aspect, the control subsystem 218 may further include or be in communication with volatile media (also referred to as volatile storage, memory, memory storage, memory circuitry and/or similar terms used herein interchangeably). In one aspect, the volatile storage or memory may also include one or more memory element 306 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 306 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the control subsystem 218 with the assistance of the processing element 305 and operating system.

In one aspect, the control subsystem 218 may further include or be in communication with non-volatile media (also referred to as non-volatile storage, memory, memory storage, memory circuitry and/or similar terms used herein interchangeably). In one aspect, the non-volatile storage or memory may include one or more non-volatile storage or storage media 307 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 307 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Storage media 307 may also be embodied as a data storage device or devices, as a separate database server or servers, or as a combination of data storage devices and separate database servers. Further, in some aspects, storage media 307 may be embodied as a distributed repository such that some of the stored information/data is stored centrally in a location within the system and other information/data is stored in one or more remote locations. Alternatively, in some aspects, the distributed repository may be distributed over a plurality of remote storage locations only. An example of the aspects contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, storage media 307 may encompass one or more data stores configured to store information/data usable in certain aspects.

According to some aspects, and as shown in at least FIGS. 2 and 3, the depalletization system 200 may be a computer program product 218 including at least one non-transitory computer-readable storage medium 307 having computer-readable program code portions stored therein. The computer-readable program code portions may include an executable portion. The executable portion may be configured to detect, from a perception subsystem 202 associated with the depalletization system 200, a first set of objects (such as objects 504, 506, 508, etc. in stack 500 in FIG. 5). (Reference is made to FIG. 5, but it will be understood that the depalletization system 200 may relate to any suitable number of palletized objects.) According to some aspects, the first set of objects may include two or more palletized objects (e.g., 506, 508) of a plurality of palletized objects (e.g., 504, 506, 508, 510, 512, etc.) in a stack (e.g., 500). The two or more palletized objects (e.g., 506, 508) of the first set may be disposed above a threshold height (e.g., 502). The stack (e.g., 500) may have a front side and a back side. The executable portion may also be configured to determine, based at least in part on the detected first set of objects (e.g., 506, 508), that a first object of the first set (e.g., 506) is disposed closer than a second object of the first set (e.g., 508) is to the front side of the stack (e.g., 500). The first object (e.g., 506) of the first set may be disposed lower than the second object (e.g., 508) of the first set. The executable portion may further be configured to manipulate an end effector (e.g., end effector 113 of system 100A) associated with a depalletization system (e.g., system 100A of FIG. 1A) to remove the first object of the first set (e.g., 506) from the stack (e.g., 500) before removing the second object (e.g., 508) of the first set from the stack (e.g., 500) and depositing the first object (e.g., 508) of the first set in one or more deposit locations (e.g., conveyor 111 in FIG. 1A).

In some aspects, the executable portion of the computer-readable program code portion is further configured to represent a plurality of palletized objects (e.g., objects 504, 506, 508, 510, 512, etc.) as an object set of electronic data points, including a first object set of electronic data points associated with the first object of the first set, and the end effector (e.g., end effector 113 of system 100A) as an end effector set of electronic data points. The executable portion may also be configured to simulate the vertical removal of the first object set of electronic data points from the object set of electronic data points by means of the end effector set of electronic data points. The executable portion may further be configured to, during the simulated vertical removal of the first object set of electronic data points, detect any potential collisions between the first object set of electronic data points and the robotic set of electronic data points.

As indicated, in one aspect, the control subsystem 218 may also include one or more network and/or communications interface 308 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the control subsystem 218 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control subsystem 218 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Example Depalletization

Figure 4:
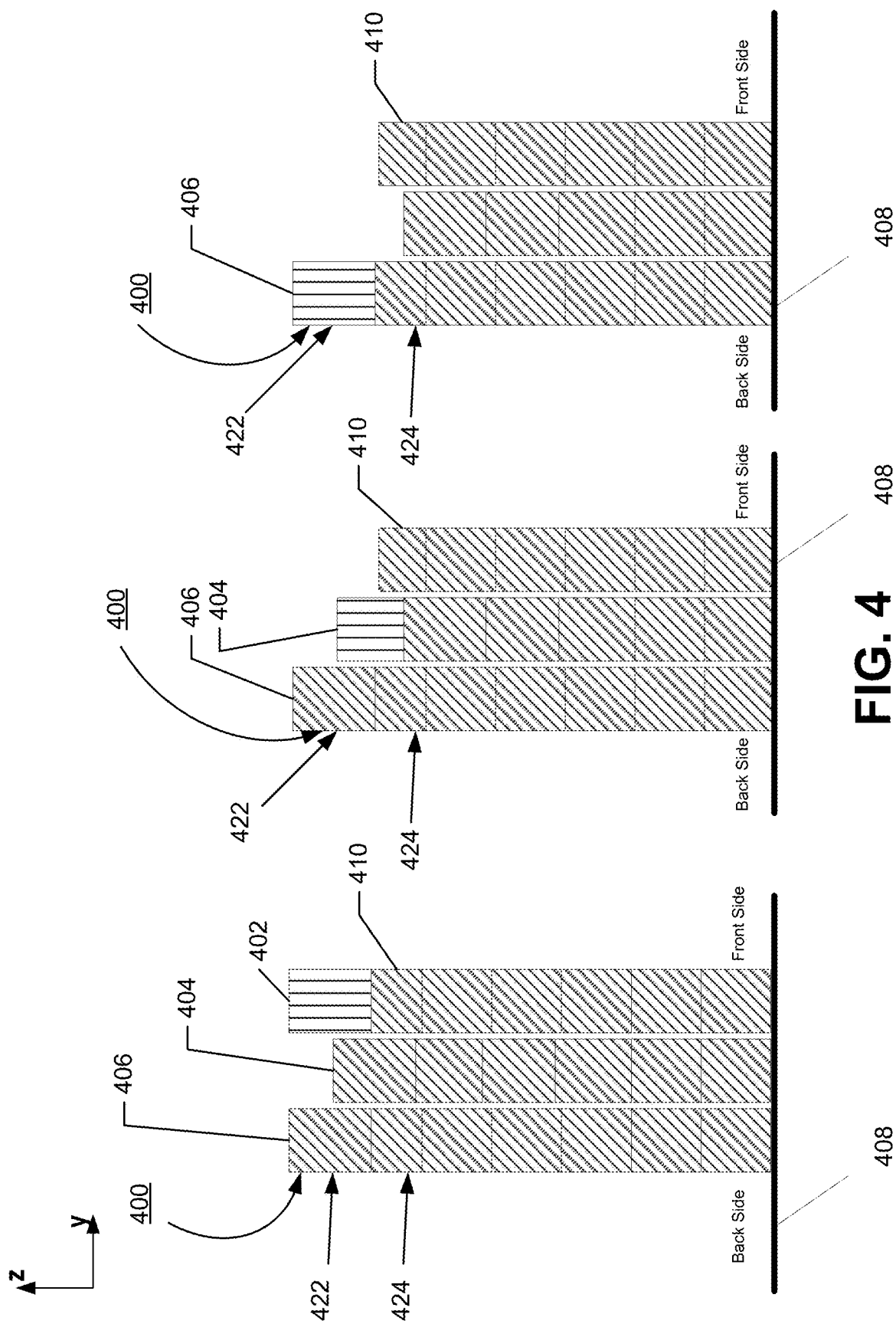
Figure 5:
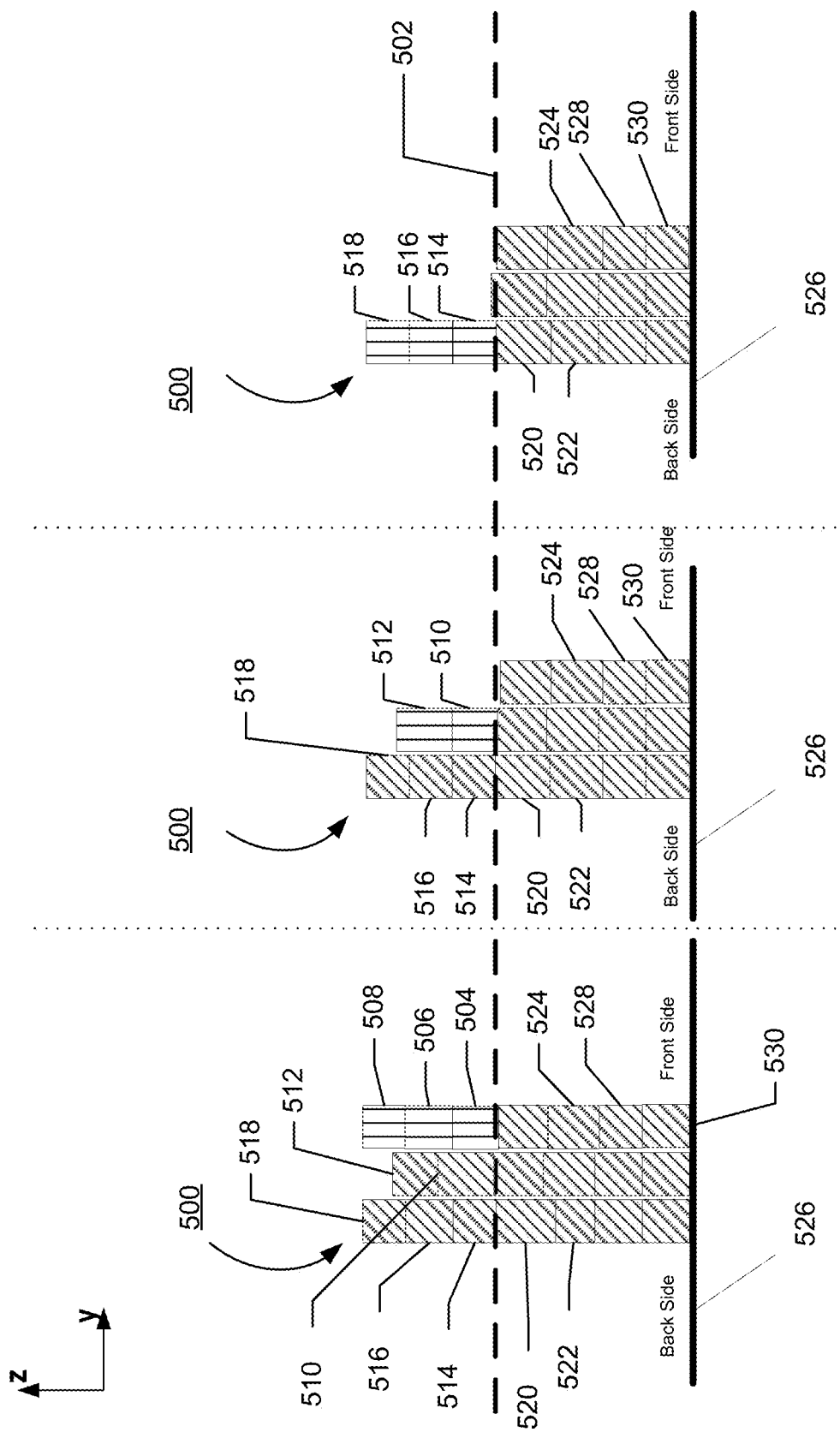

FIG. 4 and FIG. 5 are example diagrams illustrating example depalletization of objects on example pallets in accordance with various aspects of the present disclosure. In the various embodiments disclosed herein, the robotic systems, motion planning systems, vision systems, and other hardware and/or software systems described herein may be used to depalletize the various objects according to the processes shown in FIG. 4 and/or FIG. 5.

As shown in FIG. 4, there is a stack 400 of palletized objects (e.g., packages) configured to be depalletized at least partially according to a first algorithm. In some aspects, there are a plurality of objects 402, 404, 406 on a pallet 408 to be removed. In some aspects, the pallet 408 may be defined as any location that contains a stack of objects (such as stack 400) for depalletizing, without regard to the structure or composition of the pallet 408. FIG. 4 represents on example of a depalletization operation. According to some aspects, objects 402, 404, 406 of stack 400 are depalletized by removing the object on top of the stack and closest to the front side of the stack 400.

As shown in FIG. 4, a first object 402 is first removed, followed by a second object 404, and then a third object 406 is removed, according to some aspects. In the depicted embodiment, the robotic system depalletizes the objects in horizontal layers, working front-to-back. In some aspects, a horizontal layer may be marked as, for example, "layer one" 422 (e.g., the layer in which the first, second, and third objects 402, 404, 406) are placed. A horizontal layer may be determined, in some aspects, by determining the coordinates of the top surface of an object (e.g., first object 402) and the max height of each object that is being depalletized (or palletized, according to some aspects). For example, any object having a top surface coordinate height within one max height of the highest measured object may be identified as a single layer, from which the algorithm may proceed as described herein. The max height may be predetermined, such as by recording a maximum package used in the palletization system. The robotic system clears this layer of objects 402, 404, and 406 before moving on to the next layer (e.g., "layer two" 424) for depalletization, according to some aspects. For example, in some embodiments, the first algorithm may give priority to vertical position over front-to-back (e.g., horizontal) position. This depalletization method shown in FIG. 4 may be prone to error, though, if the objects 402, 404, 406 are to be lifted from more than a reachable height (not reachable by, for example, the end effector 113 of system 100A). This depalletization diagram shown in FIG. 4 may also be prone to collisions between the objects 402, 404, 406 because objects are removed from the stack 400 layer-by-layer, without accounting for disparities in the size of the objects 402, 404, 406 in the layer. For example, if the second object 404 were close to a maximum reachable height for the robotic system, the robotic arm of the robotic system would be unable to lift the second object 404 over the upper corner of the object 410 shown lower and closer to the front than the second object 404. According to some aspects, the system, via the vision and processing sub-systems described herein, checks if the object(s) are fully visible and the object that is on top (e.g., an object that is fully visible) is depalletized before the object below it (e.g., an object that is not fully visible). This process may avoid issues with collisions for packages that horizontally overlap within the pallet. In various embodiments, the process depicted in FIG. 4 may be utilized for objects below a threshold height, while in some embodiments, a second depalletization process may be used for objects above a threshold height (e.g., six feet for the depicted robotic system of FIG. 1).

As shown in FIG. 5, and according to some aspects, there is a stack 500 of palletized objects (e.g., packages) configured to be depalletized at least partially according to a second algorithm. In some aspects, there exist a plurality of objects 504, 506, 508, 510, 512, 514, 516, and 518 that are disposed above a threshold height 502. In some aspects, there exist a plurality of objects 520, 522, 524, 528 located below the threshold height 502. In some aspects, the stack 500 is placed on a pallet 526. In some aspects, the pallet 526 may be defined as any location that contains a stack of objects (such as stack 500) for depalletizing, without regard to the structure or composition of the pallet 526.

To determine if the objects are above or below the threshold, the system may image the stack of objects and compute a height associated with at least a portion of the objects. In some aspects, system operators may estimate the box's height by means of a measuring device (e.g., a laser with measurement functionality). For example, a vision sub-system may identify a candidate object or objects to be picked based on the layering and selection algorithms discussed herein. The system may then identify the height of the package, such as for threshold determination purposes, using a measurement of the height of the bottom of the box (e.g., with the laser measuring device discussed above). The computed height may be a single height value based on one or more landmarks associated with the object. For example, in various embodiments, the height computed for a given object may be computed as a top, bottom, center, grasping location, or other location associated with the object as determined by one or more image processing algorithms (e.g., a machine learning image recognition model) and/or motion planning algorithms performed by the systems described herein. A similar process may be used to determine a front-to-back and left-to-right position of a given object in the horizontal plane.

According to some aspects, the threshold height 502 is determined in reference to a "reachability constraint" of the robotic arm 115, 135 of systems 100A, 100B, respectively. Reachability constraints, in some aspects, may be governed by the robotic arm 115, 135 that is used by the systems 100A, 100B, as well as by the distance of the pallet (e.g., pallet 526) from the robotic arm 115, 135. According to some aspects, the threshold height is based on the standard height of pallets (e.g., six feet) as discussed herein, with "large" pallets being those that exceed the standard height, which may also determine the threshold (e.g., the threshold height may be set at a standard pallet height, such as six feet). For example, in the embodiment of the robotic system shown in FIG. 1, one example threshold height may be six feet from a baseline (e.g., the ground). In some aspects, the various processes herein may allow a robotic system (e.g., system 100A) to pick objects higher than a threshold for the first time. For example, the various processes herein may allow the robotic system to perform better and extract a greater range of operation than the same robotic system with a different algorithmic picking process. For example, in some embodiments, the robotic systems described herein may pick objects up to eight feet high with a threshold height set at six feet, whereas a similar robotic system without the various processes and operations described herein may be limited to six feet or less. According to other aspects, the perception subsystem 202 may be used to determine the threshold height 502.

As shown in at least FIG. 5, and according to some aspects, objects are depalletized in reference to a "front side" of the stack 500. In some aspects, the "front side" may be defined as a side of a palletized stack that is closest to and/or oriented in a direction that is closest to facing a conveyor or other location for depositing objects. According to some aspects, objects (e.g., objects that are lower than the threshold height 502, but not limited to such objects) may also be depalletized according to factors other than closeness to the "front side," including, but not limited to, closeness to a conveyor or other deposit location, area of the pick surface (i.e., length of object multiplied by width of object), height of the object, and other appropriate factors that will be understood by skilled artisans.

According to some aspects, and as shown in at least FIG. 5, there is a first set of objects 504, 506, 508, 510, 512, 514, 516, and 518 that are disposed above threshold height 502. According to some aspects, there is a second set of objects 520, 522, and 524 disposed below threshold height 502. According to some aspects, and as described in greater detail in this disclosure for FIGS. 7A-7G, objects in the first set 504, 506, etc., which are above the threshold height 502, may be depalletized before objects in the second set 520, 522, 524, which are below the threshold height 502. According to some aspects, and as also described in greater detail in this disclosure for FIGS. 7A-7G, objects that are closer to the front side of the stack 500 may be depalletized before objects that are farther from the front side of the stack 500, including for objects that are one or more layers below objects that have not yet been picked (e.g., objects both closer to the front side of the stack and lower than objects farther from the front side may be picked before objects higher and farther from the front side). For example, in some embodiments, the second algorithm may give priority to front-to-back (e.g., horizontal) position over vertical position.

According to some aspects, the objects 504, 506, etc. on the pallet 526 may be of varying weights and dimensions. According to other aspects, the objects 504, 506, etc. on the pallet 526 may be of uniform weights and dimensions. It will be understood that the examples disclosed herein account for variations in sizes and weights of objects being depalletized.

Figure 6A:
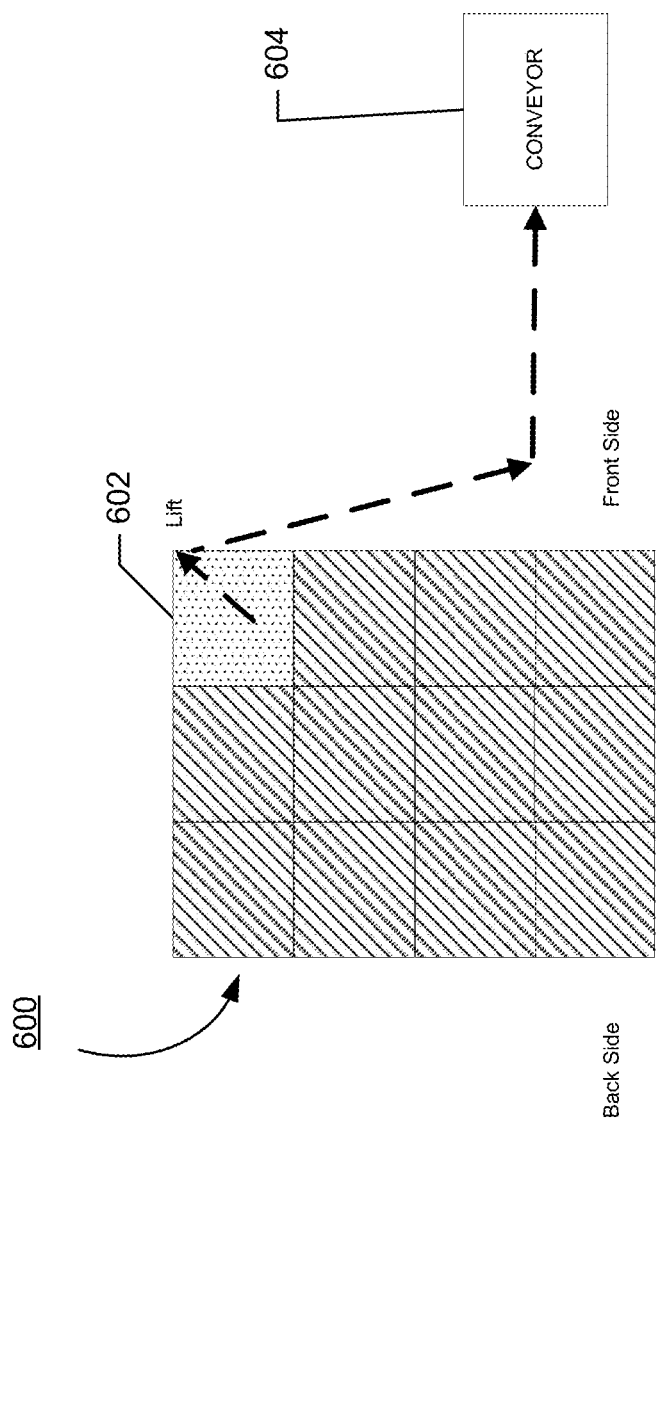

FIG. 6A depicts a top view of a pallet, including lift trajectory, pre-place trajectory, and place trajectory for a traditional grasp sequence. As shown in at least FIG. 6A, in one example of a traditional grasp sequencing strategy, an end effector contacts an object 602 in a stack 600. In some aspects, an end effector (e.g., end effector 113 of system 100A) translates in the −z-direction to contact an object 602 of stack 600. As a result, in some aspects, a robotic system (such as system 100A) prioritizes grasping an object that may have a high probability of failure in pick motion systems because, while performing the z-translation, the gripper of the robotic system may collide with other objects in the stack 600.

Figure 6B:
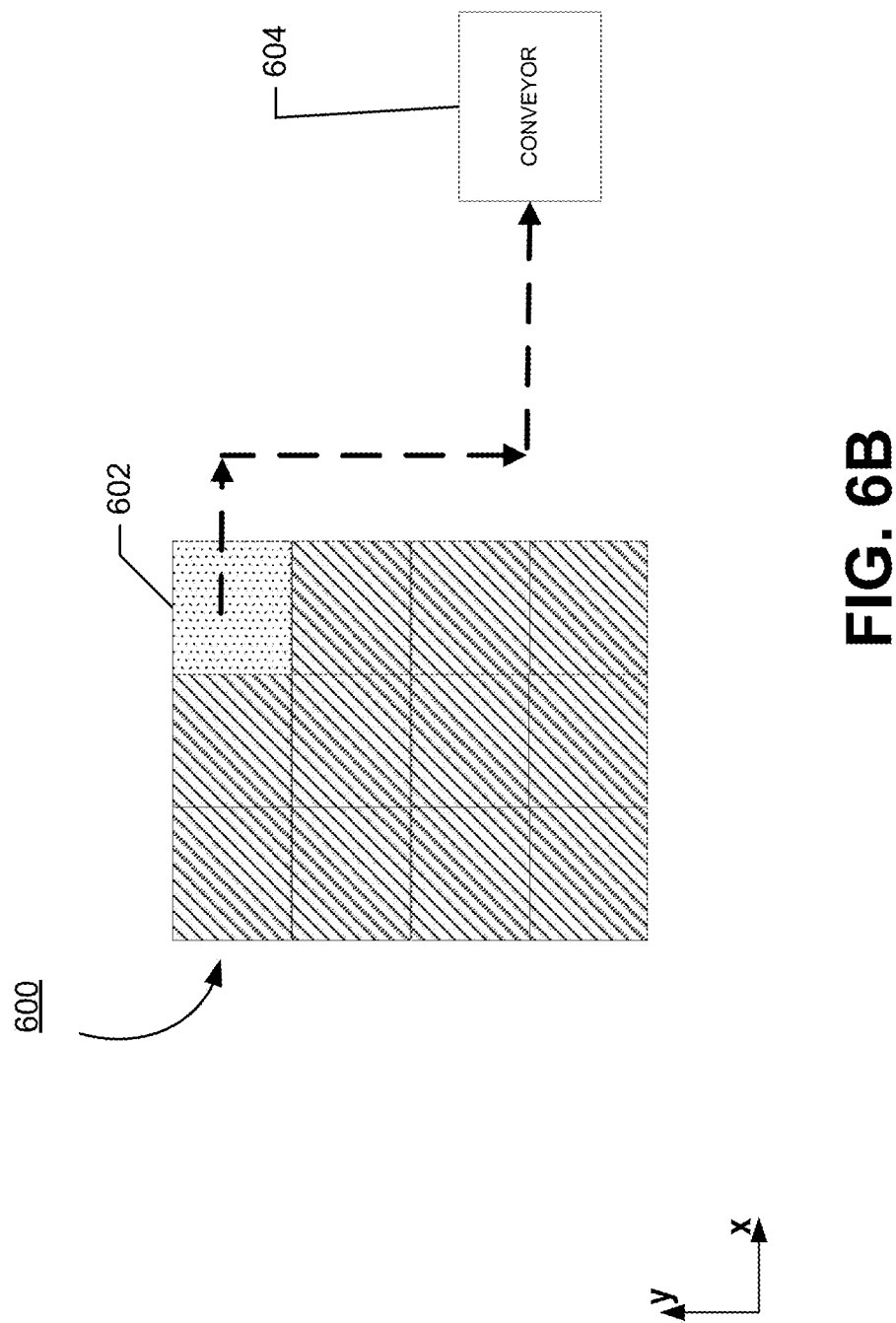

FIG. 6B depicts a top view of a pallet, including pre-place trajectory and place trajectory for a grasp sequence in accordance with various embodiments of the present disclosure. The grasp sequence shown in FIG. 6B may be used with the picking algorithm shown in FIG. 5. According to some aspects, and as shown in FIG. 6B, the object 602 in FIG. 6B has already been lifted and is being horizontally removed. As shown in FIG. 6B, in contrast to the example grasp sequencing strategy shown in FIG. 6A, an end effector (e.g., end effector 113 of system 100A) according to various embodiments discussed herein may pick an object 602 from stack 600 and remove the object linearly towards the front side/conveyor along the depicted x-axis instead of lifting the package and shifting it to one side (as in FIG. 6A). In some embodiments, the motion of FIG. 6A may be a single-step motion (e.g., in the z, y, and x directions simultaneously) whereas the motion of FIG. 6B may be a two-step motion (e.g., lift and horizontally remove). The object 602 may then be depalletized from the stack 600 and placed on the conveyor 604. It will be understood that the object 602 may be placed in any number of suitable deposit locations, not just a conveyor 604. The vertical picking shown in FIG. 6B may be supplemented in some aspects by the motion planning step 800 described in greater detail in this disclosure with respect to FIGS. 8A-8D. According to some aspects, the grasp sequence shown in FIG. 6B may be used for objects above the threshold height 502. According to some aspects the grasp sequence shown in FIG. 6B may also be used for objects below the threshold height 502. However, it will be understood that a different grasp sequence may also be used for objects below the threshold height 502.

According to some aspects, a linear algorithm may be incorporated into the grasp sequencing strategy as shown in FIG. 6B to make a collision-free grasp. The linear algorithm may make use of heuristics, motion-planning, and a grasp offsetting algorithm, shown in FIG. 6C. According to some aspects, the factors affecting grasp offset may include, but are not limited to, direction of collision for pick candidate and available space for offsetting pick pose. According to some aspects, the algorithm effects include, but are not limited to, if current pick pose is in collision, this algorithm will generate a new pick pose (offset) such that the new pick pose will be collision free.

Example Depalletization Methods

FIGS. 7A-7G are example flow diagrams illustrating example computer-implemented methods of depalletization in accordance with various aspects of the present disclosure. In some aspects, these example flow diagrams illustrated in FIGS. 7A-7G for robotic depalletization 700 are performed in reference to the palletized objects shown in the various embodiments of at least FIGS. 4, 5, 6A and 6B. In some aspects, the steps in the example flow diagrams in FIGS. 7A-7G (e.g., steps 702, 704, 706, etc.) may be performed sequentially (e.g., step 702 before step 704), while in other aspects the steps may be performed simultaneously (e.g., step 702 occurring concurrently with step 704), or in any order necessary to achieve a desired outcome. In some aspects, the steps may be performed by individual subsystems of an exemplary system (e.g., one step to be performed by the execution subsystem 210 and another to be performed by the perception subsystem 202). In other aspects, the steps may be performed by a single subsystem, or by multiple subsystems acting in conjunction.

According to some aspects, the flow diagrams of FIGS. 7A-7G can be viewed in reference to FIG. 5, and Applicant will reference FIG. 5 in the following disclosure for example purposes. However, it will be understood that the flow diagrams of FIGS. 7A-7G can be viewed in reference to any suitable palletized diagrams. Also, according to some aspects, the flow diagrams of FIGS. 7A-7G can be viewed in reference to the systems disclosed in FIGS. 1-3, and Applicant may refer to such systems in the following disclosure. However, it will also be understood that the flow diagrams of FIGS. 7A-7G can be viewed in reference to any suitable palletized systems.

In general, and as is described in greater detail with respect to FIGS. 7A-7G, an example depalletization method is provided that prioritizes first removing objects (such as packages) that are above a threshold height (e.g., threshold height 502 in FIG. 5) and closer to the front side of the stack (e.g., stack 500 in FIG. 5) before removing objects that are farther from the front side of the stack but also above the threshold height.

Figure 7A:
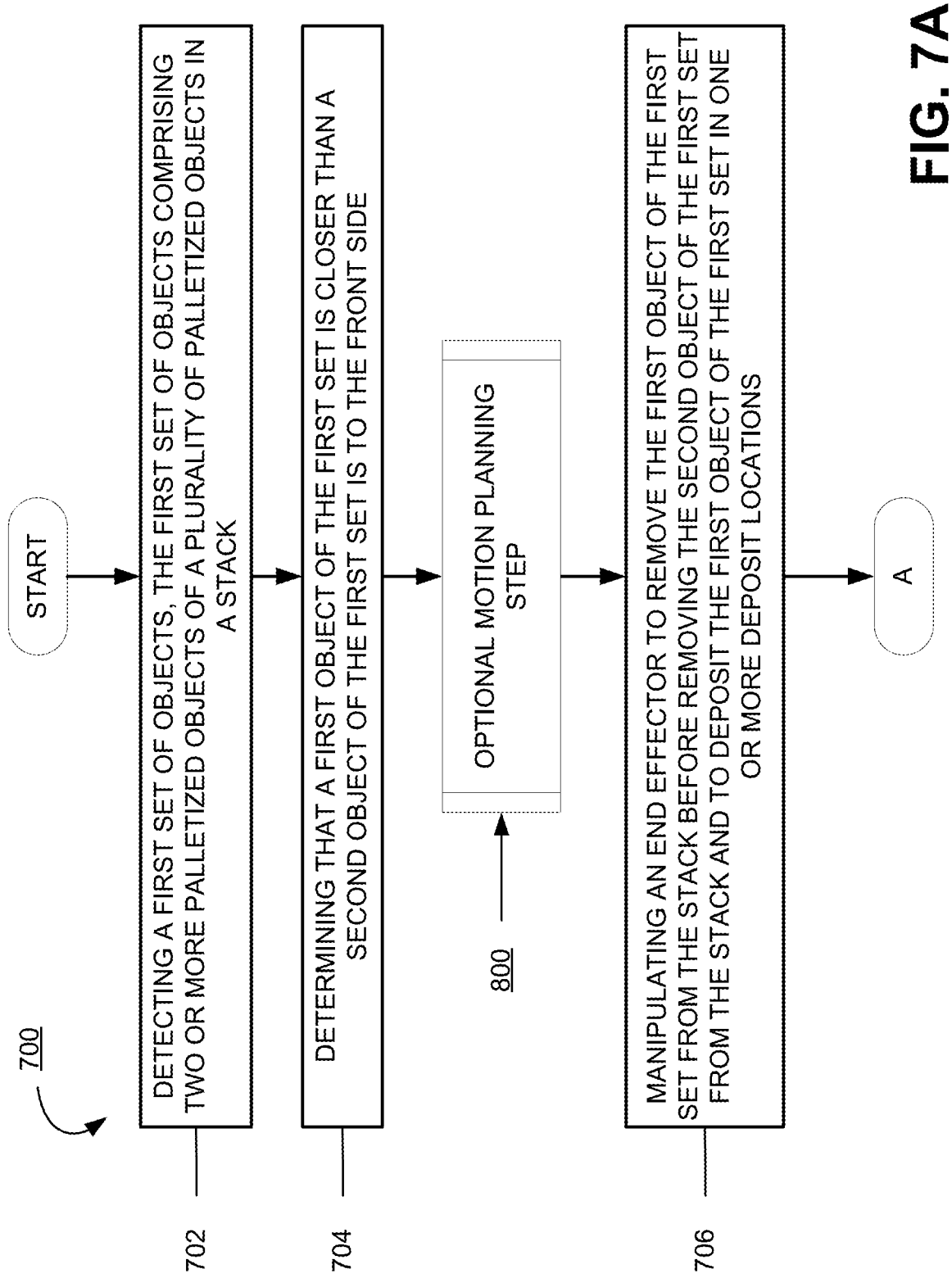

As shown in at least FIG. 7A, in accordance with various aspects of the present disclosure, a computer-implemented method for robotic depalletization 700 is provided. According to some aspects, a step 702 of detecting a first set of objects 506, 508, the first set of objects 506, 508 comprising two or more palletized objects 506, 508 of a plurality of palletized objects 504, 506, 508, 510, 512, 514, 516, 518, etc. in a stack 500, is performed. According to some aspects, a step 704 of determining that a first object 506 of the first set is closer than a second object 508 of the first set is to the front side, is performed. According to some aspects, there may be an optional motion planning step 800 that is performed. Motion planning step 800 is described in greater detail later in this disclosure, in reference to at least FIGS. 8A-8D. According to some aspects, a step 706 of manipulating an end effector (e.g., end effector 113 of system 100A) to remove the first object 506 of the first set from the stack 500 before removing the second object 508 of the first set from the stack 500 and to deposit the first object 506 of the first set in one or more deposit locations (e.g., a conveyor 111 of system 100A), is performed.

According to some aspects, and as shown in at least FIG. 7A, the flow chart of FIG. 7A may either terminate with point "A," or point "A" may represent a transition point for additional steps to be performed. According to some aspects, point "A" may lead into the steps shown in FIGS. 7B, 7D, 7E, and 7G. However, it will be understood that, in some aspects, point "A" may indicate the end of the computer-implemented method for depalletization 700. It will be understood that points "B," "C," "D," "E," "F," "G," and "H," as shown in FIGS. 7A-7G and 8A-8D, denote similar functionality in at least some embodiments of the present disclosure. The various steps described herein may be performed in any order in which they are logically or physically capable of being performed.

Figure 7B:
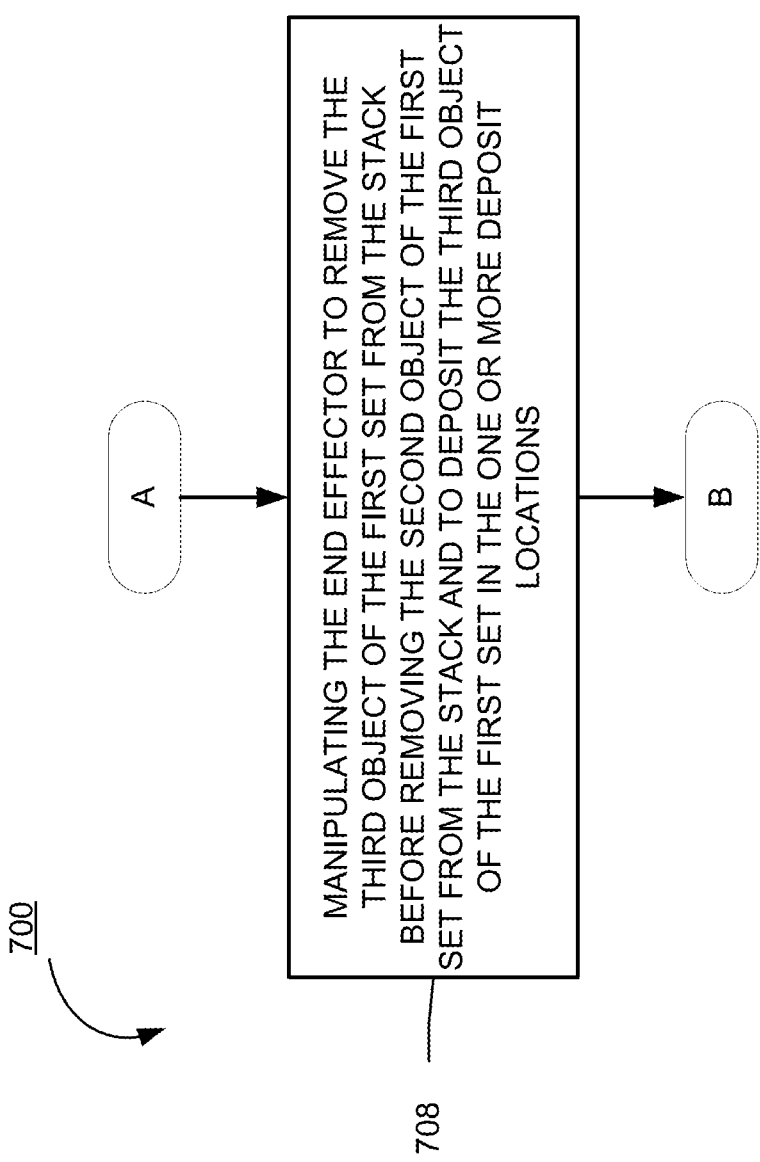

As shown in FIG. 7B, in some aspects, the two or more palletized objects 506, 508 of the first set may also include a third object 504. The third object 504 of the first set may be lower than the second object 508 of the first set. The third object 504 of the first set may be disposed closer than the second object 508 of the first set is to the front side of the stack 500. According to some aspects, the computer implemented method 700 may include performing a step 708 of manipulating the end effector (e.g., end effector 113 of system 100A) to remove the third object 504 of the first set from the stack 500 before removing the second object 508 of the first set from the stack and to deposit the third object 504 of the first set in the one or more deposit locations (e.g., conveyor 111 of system 100A).

Figure 7C:
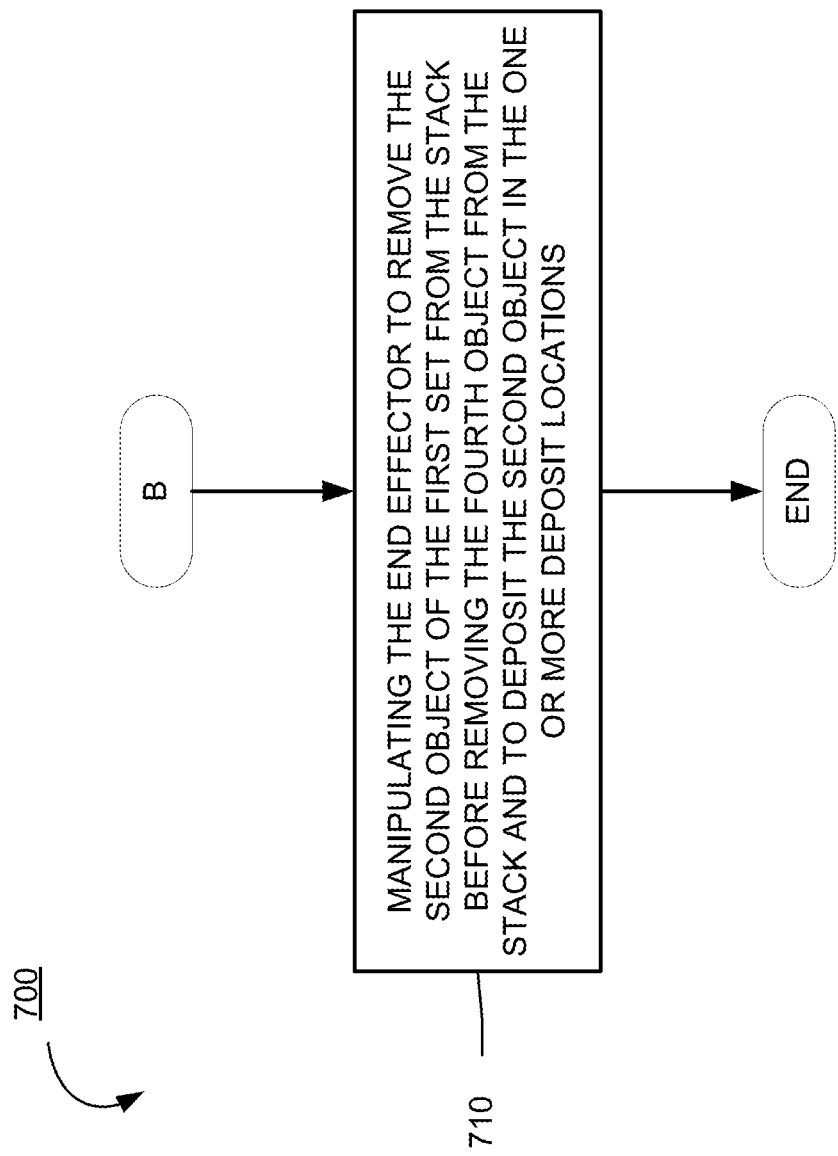

As shown in FIG. 7C, in some aspects, the two or more palletized objects of the first set may also include a fourth object. The fourth object 510 of the first set may be disposed farther than the second object 508 of the first set is from the front side of the stack 500. According to some aspects, the computer implemented method 700 may include performing a step 710 of manipulating the end effector (e.g., end effector 113 of system 100A) to remove the second object 508 of the first set from the stack 500 before removing the fourth object 510 from the stack and to deposit the second object in the one or more deposit locations (e.g., conveyor 111 of system 100A).

As shown in FIG. 7D, in some aspects, the computer-implemented method 700 may further include a step 712 of detecting a third palletized object 524 in the stack. The third palletized object 524 may be disposed below the threshold height 502. According to some aspects, the computer implemented method 700 may include performing a step 714 of determining that the third object 524 is closer than the second object 508 of the first set is to the front side of the stack 500. The third object 524 may be disposed lower than the second object 508 of the first set. The computer-implemented method may further include a step 716 of manipulating the end effector (e.g., end effector 113 of system 100A) to remove the second object 508 from the stack 500 before removing the third object 524 of the first set from the stack 500 and to deposit the second object 508 of the first set in the one or more deposit locations (e.g., conveyor 111 of system 100A).

As shown in FIG. 7E, in some aspects, the computer-implemented method 700 may further include a step 718 of detecting a second set of objects 520, 522, 524, 526. The second set of objects may also include two or more additional palletized objects 522, 528 of the plurality of palletized objects in the stack. The two or more additional palletized objects 522, 528 of the second set of objects may be disposed below the threshold height 502. According to some aspects, the computer-implemented method 700 may further include a step 720 of determining that a first object 528 of the second set is disposed closer than a second object 522 of the second set is to the front side. The first object 528 of the second set may be disposed lower than the second object 522 of the second set. According to some aspects, the computer-implemented method 700 may include a step 722 of manipulating the end effector (e.g., end effector 113 of system 100A) to remove the second object 522 of the second set from the stack 500 before removing the first object 522 of the second set from the stack and to deposit the first object 522 of the second set in the one or more deposit locations (e.g., conveyor 111 of system 100A).

Figure 7F:
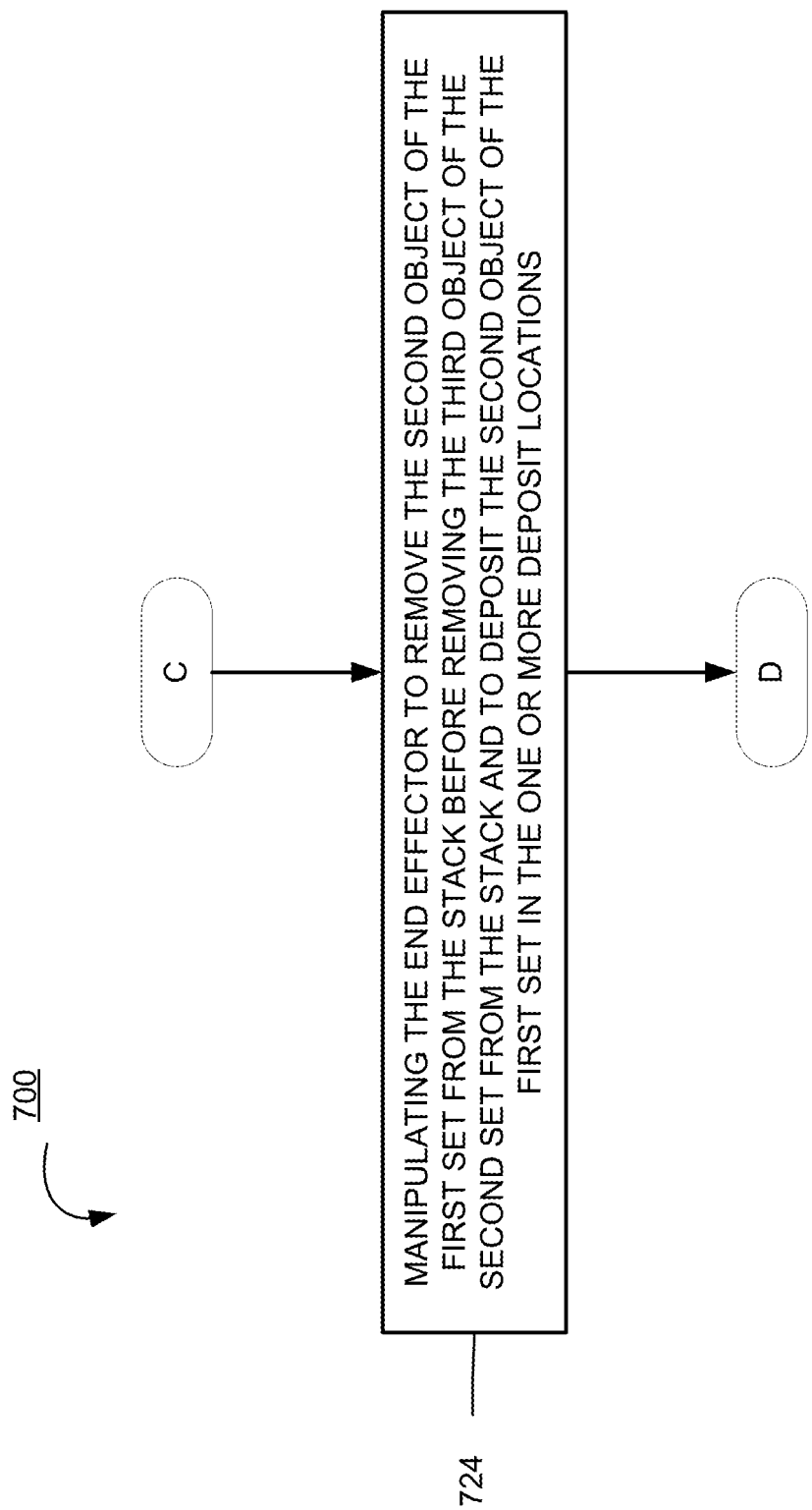

As shown in FIG. 7F, in some aspects, the two or more additional palletized objects 522, 528 of the second set may include a third object 530. The third object 530 of the second set may be lower than the second object 508 of the first set and disposed closer than the second object 508 of the first set is to the front side of the stack 500. According to some aspects, the computer-implemented method 700 may further include step 724 of manipulating the end effector (e.g., end effector 113 of system 100A) to remove the second object 508 of the first set from the stack 500 before removing the third object 530 of the second set from the stack 500 and deposit the second object 508 of the first set in the one or more deposit locations (e.g., conveyor 111 of system 100A).

Figure 7G:
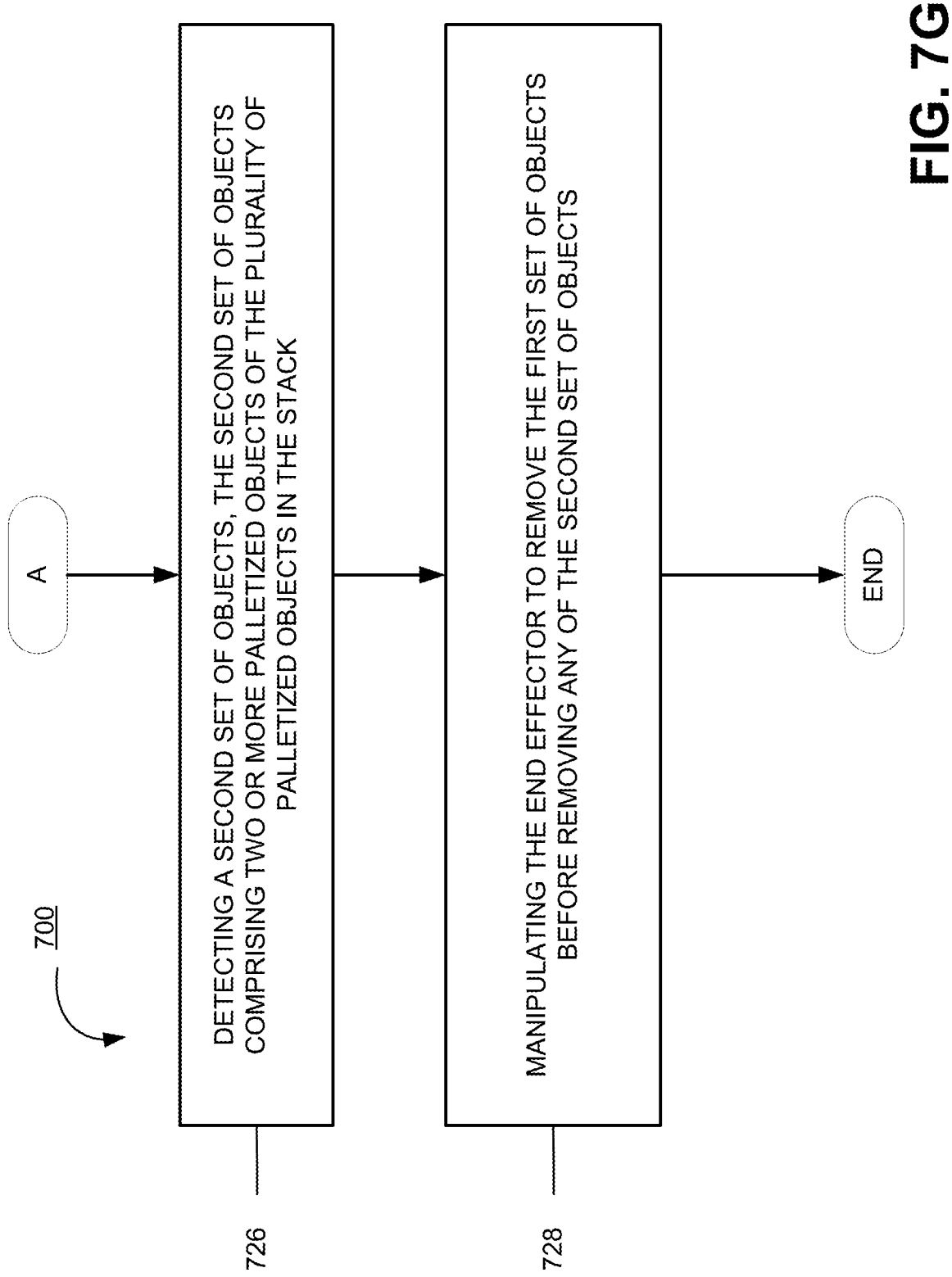

As shown in FIG. 7G, in some aspects, the computer-implemented method 700 may include a step 726 of detecting a second set of objects. The second set of objects may include two or more additional palletized objects 520, 522, 524, 528 of the plurality of palletized objects in the stack. The two or more additional palletized objects 520, 522, 524, 528 of the second set of objects are disposed below the threshold height 508. The computer-implemented method 700 may also include a step 728 of manipulating the end effector (e.g., end effector 113 of system 100A) to remove the first set of objects 504, 506, 508, 510, 512, 514, 516, 518 before removing any of the second set of objects 520, 522, 524, 528.

Example Motion Planning

The present disclosure also contemplates various processes for planning the motion of the various components of the robotic systems and the objects and other devices, components, and the like with which the robotic systems interact. In some embodiments, the robotic systems may face a constraint motion planning problem, such as when using a vertical picking algorithm as discussed herein (e.g., in accordance with the embodiment of FIG. 6B). In some such embodiments, to overcome the constraint motion planning problem, the robotic system may check for primary collision between an end effector and voxels representing the object to be picked. For example, the robotic system may simulate the components of the robotic system and one or more objects to be picked in a three-dimensional environment. The collision detection process may check for collisions between the end effector, the primary target object, and one or more other objects. In some embodiments, other portions of the robotic assembly (e.g., the robotic arm, one or more individual links of the robot, and/or portions thereof) may also be checked for possible collisions with the stack. If a collision is imminent, the robotic system checks for the pose of the colliding voxel and shift the grasp such that the new shifted grasp can still accommodate the box in the gripper envelope while avoiding the colliding voxel.

As shown in FIG. 8A, in some aspects, the computer-implemented method 700 may include a motion planning step 800 prior to removing the first object of the first set from the stack. An example of this is shown in at least FIG. 7A. According to some aspects, the flow diagrams of FIGS. 8A-8D can be viewed in reference to FIG. 5, and Applicant will reference FIG. 5 in the following disclosure. However, it will be understood that the flow diagrams of FIGS. 8A-8D can be viewed in reference to any suitable palletized diagrams. Also, according to some aspects, the flow diagrams of FIGS. 8A-8D can be viewed in reference to the systems disclosed in FIGS. 1-3, and Applicant may refer to such systems in the following disclosure. However, it will also be understood that the flow diagrams of FIGS. 8A-8D can be viewed in reference to any suitable palletized and depalletized systems.

The motion planning step 800 may include a step 802 of representing the plurality of palletized objects 504, 506, 508, etc. as an object set of electronic data points, including at least one of a first object electronic data point associated with the first object 506 of the first set, and the end effector (e.g., end effector 113 of system 100A) as an end effector set of electronic data points. The motion-planning step 800 may also include a step 804 of simulating the vertical removal of the at least one first object electronic data point from the object set of electronic data points by means of the end effector set of electronic data points. The motion-planning step 800 may further include a step 806 where, during the simulated vertical removal of the at least one first object electronic data point, checking for potential collisions between the at least one first object electronic data point and the end effector set of electronic data points.

As shown in FIG. 8B, in some aspects, the motion planning step 800 includes a step 808 checking for potential collisions between other object data points of the object set of electronic data points and the at least one first object electronic data point.

As shown in FIG. 8C, in some aspects, the motion planning step 800 may include a step 810 of adjusting the end effector set of electronic data points such that the end effector set of electronic data points is configured to engage a simulated grip on the at least one first object electronic data point without the primary collision during the simulated vertical removal of the at least one first object electronic data point from the object set of electronic data points.

As shown in FIG. 8D, in some aspects, the motion-planning step 800 may include a step 812 of checking for a pose of a colliding data point associated with the primary collision between the end effector set of electronic data points and the first object set of electronic data points and shifting the simulated grip to avoid the primary collision.

In some aspects, the object set of electronic data points described in at least FIGS. 8A-8D are voxels. It will be understood that voxels represent a value in three-dimensional space, analogous to how pixels represent values in a two-dimensional space. It will be understood that, in some aspects, the set of electronic data points described in at least FIGS. 8A-8D may be pixels. According to some aspects, voxels may efficiently represent objects for depalletization and may aid in visualization during the motion planning step 800.

FIG. 9 is an example three-dimensional representation of electronic data points showing an example depalletization system as a set of electronic data points 900 and an example surrounding environment in accordance with various aspects of the present disclosure. As shown in FIG. 9, according to some aspects, a plurality of palletized objects may be represented as an object set of electronic data points 902. According to some aspects, this set may include at least one of a first object electronic data point 904, and the end effector (e.g., the end effector 113 of robotic arm 115) as an end effector set of electronic data points 906. According to some aspect, the vertical removal of the least one first object electronic data point 904 may be removed from the object set of electronic data points 902 by means of the end effector set of electronic data points 906. According to some aspects, during the simulated vertical removal of the at least one first object electronic data point 904, there may be a check for potential collisions between the at least one first object electronic data point 904 and the end effector set of electronic data points 906.

Also, according to some aspects, the robotic system (e.g., the system 100A) may be represented as a set of robotic data points 908. According to some aspects, and as shown in FIG. 9, there may be multiple end effector sets of electronic data points 906. According to some aspects, the robotic arm (e.g., robotic arm 115 of system 100A) may be represented as a robotic arm set of electronic data points 910, which may comprise the end effector set of electronic data points 906. According to some aspects, there may be multiple robotic arm sets of electronic data points 910 for the robotic electronic data points 908. In some such embodiments, the various components of the robotic system may be checked for collisions during motion planning.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

The invention claimed is:

1. A computer-implemented method for robotic depalletization, the method comprising:
    detecting a first set of objects from a plurality of palletized objects, the first set of objects comprising two or more palletized objects of a plurality of palletized objects in a stack, wherein the two or more palletized objects of the first set of objects are disposed above a threshold height, wherein the stack has a front side and a back side;
    determining that a first object of the first set of objects is closer to the front side of the stack than a second object of the first set of objects;
    in response to determining that the first object of the first set of objects is closer to the front side of the stack, determining whether the first object of the first set of objects is disposed at a lower vertical height than the second object of the first set of objects; and in response to determining the first object is disposed at the lower vertical height than the second object, manipulating an end effector to remove the first object of the first set of objects from the stack before removing the second object of the first set of objects from the stack and to deposit the first object of the first set of objects in one or more deposit locations.

2. The computer-implemented method of claim 1, wherein the two or more palletized objects of the first set of objects further comprise a third object, the third object of the first set of objects being vertically lower than the second object of the first set of objects and disposed closer than the second object of the first set of objects is to the front side of the stack, the method further comprising:

manipulating the end effector to remove the third object of the first set of objects from the stack before removing the second object of the first set of objects from the stack and to deposit the third object of the first set of objects in the one or more deposit locations.

3. The computer-implemented method of claim 2, wherein the two or more palletized objects of the first set of objects further comprise a fourth object, the fourth object of the first set of objects being disposed farther than the second object of the first set of objects is from the front side of the stack, the method further comprising:

manipulating the end effector to remove the second object of the first set of objects from the stack before removing the fourth object from the stack and to deposit the second object in the one or more deposit locations.

4. The computer-implemented method of claim 1, the method further comprising:

detecting a third palletized object in the stack, wherein the third palletized object is disposed below the threshold height;

determining that the third palletized object is closer than the second object of the first set of objects is to the front side of the stack;

in response to determining that the third palletized object is closer than the second object, determining whether the third palletized object is disposed vertically lower than the second object of the first set of objects; and in response to determining the third palletized object is disposed vertically lower than the second object, manipulating the end effector to remove the second object from the stack before removing the third palletized object of the first set of objects from the stack and to deposit the second object of the first set of objects in the one or more deposit locations.

5. The computer-implemented method of claim 1, the method further comprising:

detecting a second set of objects from the plurality of palletized objects, the second set of objects comprising two or more additional palletized objects of the plurality of palletized objects in the stack, wherein the two or more additional palletized objects of the second set of objects are disposed below the threshold height;

determining that a first object of the second set of objects is disposed closer than a second object of the second set of objects is to the front side of the stack;

in response to determining that the first object of the second set of objects is disposed closer than the second object of the second set of objects, determining whether the first object of the second set of objects is disposed lower than the second object of the second set of objects; and in response to determining that the first object of the second set of objects is disposed lower than the second object of the second set of objects, manipulating the end effector to remove the second object of the second set from the stack before removing the first object of the second set from the stack and to deposit the first object of the second set in the one or more deposit locations.

6. The computer-implemented method of claim 5, wherein the two or more additional palletized objects of the second set of objects further comprise a third object, the third object of the second set being lower than the second object of the first set of objects and disposed closer than the second object of the first set of objects is to the front side of the stack, the method further comprising:

manipulating the end effector to remove the second object of the first set of objects from the stack before removing the third object of the second set from the stack and to deposit the second object of the first set of objects in the one or more deposit locations.

7. The computer-implemented method of claim 1, the method further comprising:

detecting a second set of objects from the plurality of palletized objects, the second set of objects comprising two or more additional palletized objects of the plurality of palletized objects in the stack, wherein the two or more additional palletized objects of the second set of objects are disposed below the threshold height; and manipulating the end effector to remove the first set of objects before removing any of the second set of objects.

8. The computer-implemented method of claim 1, wherein the one or more deposit locations comprises a conveyor.

9. The computer-implemented method of claim 1, wherein the threshold height is defined by a set of reachability constraints of a robotic system comprising the end effector.

10. The computer-implemented method of claim 1, wherein the first object of the first set of objects is vertically depalletized by the end effector connected to a robotic arm comprising the end effector.

11. The computer-implemented method of claim 1, further comprising a motion planning step prior to removing the first object of the first set of objects from the stack, the motion planning step comprising:

representing the plurality of palletized objects as an object set of electronic data points, including at least one of a first object electronic data point associated with the first object of the first set of objects, and the end effector as the end effector set of electronic data points;

simulating vertical removal of at least one first object electronic data point from the object set of electronic data points by means of the end effector set of electronic data points; and during the simulated vertical removal of the at least one first object electronic data point, checking for potential collisions between the at least one first object electronic data point and the end effector set of electronic data points.

12. The computer-implemented method of claim 11, the motion planning step further comprising checking for potential collisions between other object data points of the object set of electronic data points and the at least one first object electronic data point.

13. The computer-implemented method of claim 12, the motion planning step further comprising adjusting the end effector set of electronic data points such that the end effector set of electronic data points is configured to engage a simulated grip on the at least one first object electronic data point without a primary collision during the simulated vertical removal of the at least one first object electronic data point from the object set of electronic data points.

14. The computer-implemented method of claim 13, the motion planning step further comprising checking for a pose of a colliding data point associated with the primary collision between the end effector set of electronic data points and the first object set of electronic data points and shifting the simulated grip to avoid the primary collision.

15. The computer-implemented method of claim 11, wherein the object set of electronic data points are voxels.

16. A robotic depalletization system, the robotic depalletization system comprising:
   a perception subsystem configured to detect a first set of objects from a plurality of palletized objects, the first set of objects comprising two or more palletized objects of in a stack, wherein the two or more palletized objects are disposed above a threshold height, wherein the stack has a front side and a back side;
   a processing device configured to:
      determine, based at least in part on the detected first set of objects, that a first object of the first set of objects is disposed closer to the front side of the stack than a second object of the first set,
      in response to determining the first object of the first set of objects is closer to the front side of the stack, determine whether the first object of the first set of objects is disposed at a lower vertical height than the second object of the first set of objects; and
   a robotic arm comprising an end effector, wherein the robotic arm is configured to:
      in response to determining that the first object is disposed at the lower vertical height than the second object, manipulate the first object of the first set of objects and remove from the stack the first object of the first set of objects before removing from the stack the second object of the first set of objects, and
      deposit the first object of the first set of objects in one or more deposit locations.

17. The robotic depalletization system of claim 16, wherein the robotic arm has a reachability constraint, and the perception subsystem is further configured to set the threshold height based on the reachability constraint.

18. The robotic depalletization system of claim 16, the robotic depalletization system further comprising a motion planning system, wherein the motion planning system is configured to:
   represent the plurality of palletized objects as an object set of electronic data points, including a first object set of electronic data points associated with the first object of the first set of objects, and the end effector as an end effector set of electronic data points;
   simulate vertical removal of the first object set of electronic data points from the object set of electronic data points by means of the end effector set of electronic data points; and
   during the simulated vertical removal of the first object set of electronic data points, detect any potential collisions between the first object set of electronic data points and a robotic set of electronic data points.

19. A computer program product comprising at least one non-transitory computer-readable storage medium having computer-readable program code portions stored therein, the computer-readable program code portions comprising an executable portion configured to:
   detect, a first set of objects, the first set of objects comprising two or more palletized objects of a plurality of palletized objects in a stack, wherein the two or more palletized objects of the first set of objects are disposed above a threshold height, wherein the stack has a front side and a back side;
   determine, based at least in part on the detected first set of objects, that a first object of the first set is disposed closer to the front side of the stack than a second object of the first set;
   in response to determining the first object of the first set of objects is closer to the front side of the stack, determine whether the first object of the first set is disposed at a lower vertical height than the second object of the first set; and
   in response to determining the first object is disposed at the lower vertical height than the second object, manipulate an end effector associated with the robotic depalletization system to remove the first object of the first set of objects from the stack before removing the second object of the first set from the stack and depositing the first object of the first set of objects in one or more deposit locations.

20. The computer program product of claim 19, wherein the executable portion of the computer-readable program code portion is further configured to:
   represent a plurality of palletized objects as an object set of electronic data points, including a first object set of electronic data points associated with the first object of the first set of objects, and the end effector as an end effector set of electronic data points;
   simulate vertical removal of the first object set of electronic data points from the object set of electronic data points by means of the end effector set of electronic data points; and
   during the simulated vertical removal of the first object set of electronic data points, detect any potential collisions between the first object set of electronic data points and a robotic set of electronic data points.

* * * * *